US007819361B2

(12) United States Patent
Saggio, III et al.

(10) Patent No.: US 7,819,361 B2

(45) Date of Patent: Oct. 26, 2010

(54) ACTIVE STABILIZATION OF A REFUELING DROGUE

(75) Inventors: Frank Saggio, III, Grand Rapids, MI (US); William B. Ribbens, Ann Arbor, MI (US); Kean K. Ooi, Yorba Linda, CA (US)

(73) Assignee: General Electric Company, Schenectady, NY (US)

( * ) Notice: Subject to any disclaimer, the term of this patent is extended or adjusted under 35 U.S.C. 154(b) by 475 days.

(21) Appl. No.: 11/969,108

(22) Filed: Jan. 3, 2008

(65) Prior Publication Data

US 2010/0237196 A1 Sep. 23, 2010

Related U.S. Application Data

(63) Continuation of application No. 10/849,927, filed on May 21, 2004, now Pat. No. 7,377,468, which is a continuation-in-part of application No. 10/697,564, filed on Oct. 31, 2003, now Pat. No. 6,994,294.

(60) Provisional application No. 60/498,641, filed on Aug. 29, 2003.

(51) Int. Cl.
*B64D 39/00* (2006.01)

(52) U.S. Cl. ................................ 244/135 A; 244/1 TD

(58) Field of Classification Search ............ 244/135 R, 244/135 A

See application file for complete search history.

(56) References Cited

U.S. PATENT DOCUMENTS 4,914,291 A * 4/1990 Kan et al. .............. 250/231.12
6,824,105 B2 * 11/2004 Edwards ................. 244/135 A

* cited by examiner

*Primary Examiner*—Timothy D Collins
(74) *Attorney, Agent, or Firm*—William Scott Andes; General Electric Company

(57) ABSTRACT

A refueling drogue adapted to connect to a refueling hose extending from a refueling aircraft. The drogue may include an active stabilization system adapted to effectively stabilize the refueling drogue via control surfaces on the refueling drogue when the refueling drogue is placed in an airstream.

20 Claims, 23 Drawing Sheets

ACTIVE STABILIZATION OF A REFUELING DROGUE

CROSS-REFERENCE TO RELATED PATENT APPLICATIONS

This application is a continuation of and claims priority to U.S. patent application Ser. No. 10/849,927, filed on May 21, 2004, by the same title as this application, which in turn is a continuation-in-part of and claims priority to U.S. patent application Ser. No. 10/697,564 filed on Oct. 31, 2003, entitled Stabilization of a Drogue Body. U.S. patent application Ser. No. 10/697,564 claims priority to U.S. Provisional Application Ser. No. 60/498,641 filed on Aug. 29, 2003. The entire contents of each of these applications are hereby incorporated by reference herein in their entirety.

BACKGROUND OF THE INVENTION

Aerial refueling via the probe and drogue method is known. In an exemplary refueling scenario, a refueling drogue connected to a refueling hose is unreeled from a refueling aircraft towards a receiver aircraft (an aircraft to be refueled), such as a fighter plane. The receiver aircraft has a refueling probe extending from the aircraft. The receiver aircraft maneuvers to the refueling drogue and inserts its refueling probe into the refueling drogue, at which point the refueling drogue "locks" onto the refueling probe, and a transfer of fuel from the refueling aircraft to the receiver aircraft is conducted.

It is desirable that the drogue remain as stationary as possible and/or that the drogue not rotate when extended from the refueling hose away from the refueling aircraft towards the receiver aircraft, at least before contact between the drogue and the probe is made. Unfortunately, the hose-drogue combination has a relatively large dynamic response to disturbances, so when the drogue is subjected to wind gusts and/or turbulence, the motion of the drogue becomes somewhat unpredictable, as forces imparted onto the drogue by the air cause the drogue to move and/or rotate, thus making it difficult to position the refueling probe of the aircraft to be refueled into the refueling drogue.

Thus, there is a need to reduce the disturbance response of a refueling drogue that has been extended on a refueling hose so that the movement of the drogue resulting from wind/turbulence is substantially reduced to improve the ease by which the refueling probe can be inserted in the refueling drogue.

DETAILED DESCRIPTION OF SOME OF THE EMBODIMENTS

Figure 1:
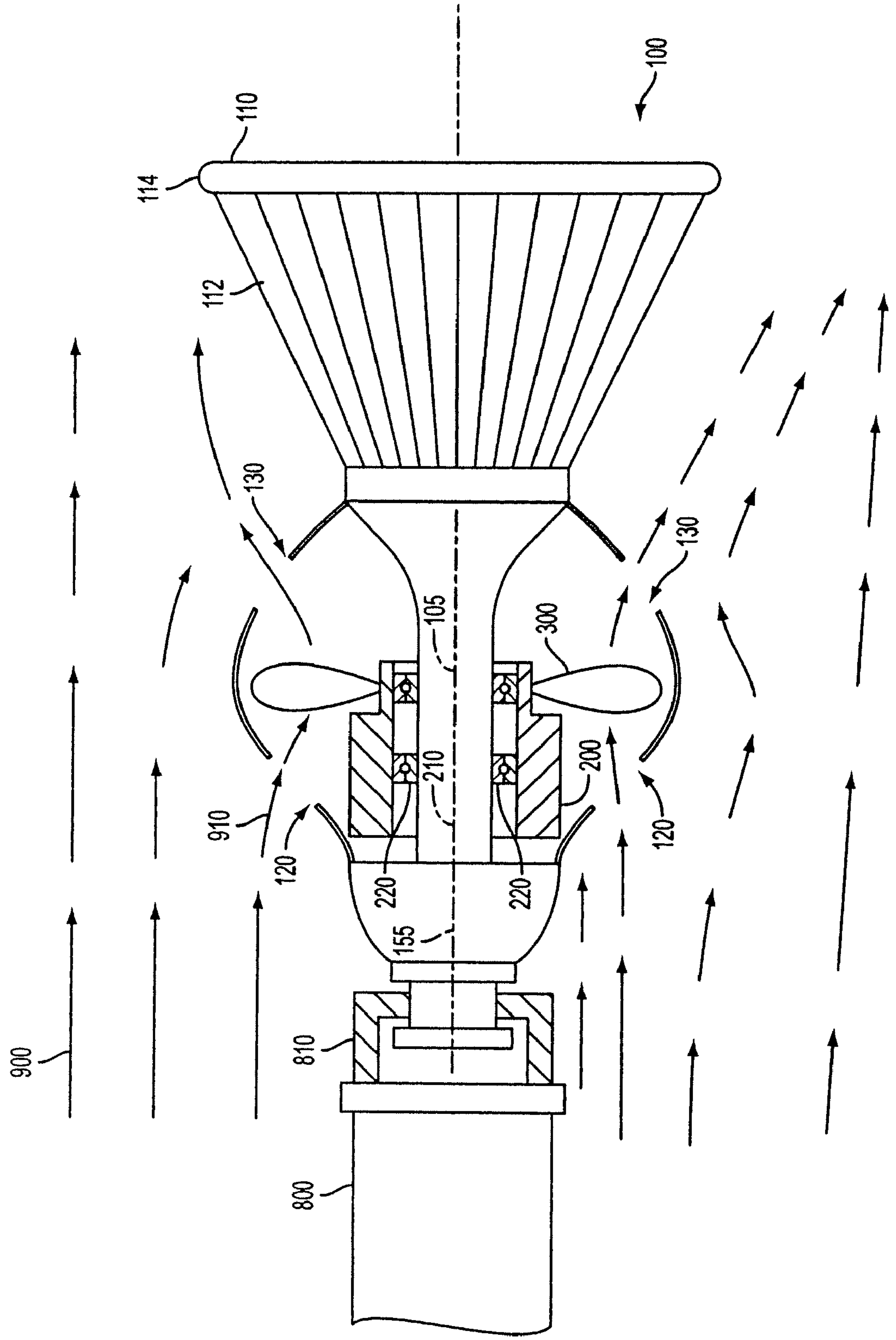
FIG. 1 shows a schematic view of a first embodiment of the present invention.
Figure 2:
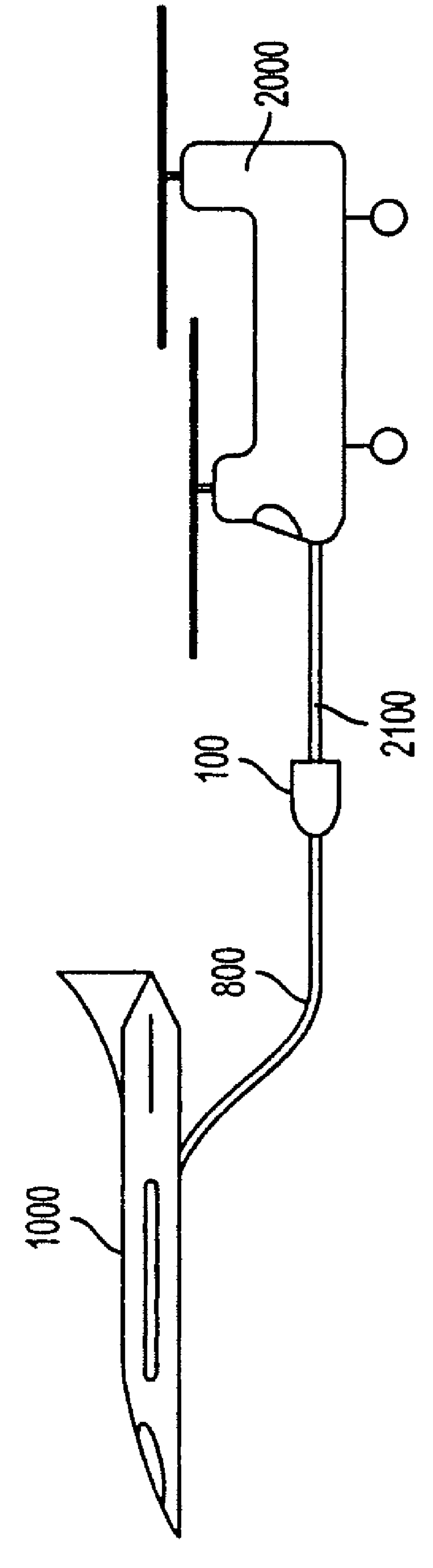
FIG. 2 shows an implementation of an embodiment of the present invention.

In a first embodiment of the present invention, as shown in FIG. 1, there is a refueling drogue 100 comprising a rotatable mass 200 mechanically coupled to an air turbine 300, such that when the refueling drogue 100 is placed in an air stream 900 that flows past the refueling drogue 100, air 910 is inducted into the drogue 100 and passes the air turbine 300 rotating the air turbine 300 and imparting a rotation onto the rotating mass 200 to produce a gyroscopic effect that effectively passively stabilizes the refueling drogue 100 as it is being dragged through the air behind a refueling aircraft 1000, such as a KC-135 and/or A-6 refueling aircraft and/or KC-130 and/or rotary wing refueling aircraft 1000 as shown in FIG. 2. The particular details of the present invention will now be described.

FIG. 2 shows a schematic of the refueling drogue 100 according to the present invention being utilized to refuel a receiver aircraft 2000 by a tanker 1000. In FIG. 2, it may be seen that a refueling hose 800 extends from the tanker 1000 and is connected to refueling drogue 100. Refueling drogue 100 is further connected to refueling probe 2100 extending from the receiver aircraft 2000. In the first embodiment of the invention, once the refueling probe 2100 of the receiver aircraft 2000 is captured in the refueling drogue 100, aviation fuel may be transferred from the tanker 1000 through the refueling hose 800, through the refueling drogue 100, and then through the refueling probe 2100, and into tanks (not shown) in the receiver aircraft 2000. In the first embodiment of the invention, the refueling drogue 100 is adapted to physically connect to the refueling probe 2100. Connection can be performed in some embodiments per military standards. In the first embodiments of the invention, the refueling hose 800 is approximately three inches in interior diameter, while in other embodiments, it is approximately two inches or four inches in interior diameter. In some embodiments, the hose is about 2.375, 2.625 and 2.875 inches in interior diameter. Thus, some embodiments of the present invention may be practiced with hoses of different sizes depending on the desired maximum fuel off loads of the refueling aircraft. In other embodiments of the invention, the hose outside diameter is about 2 inches.

The refueling drogue 100 may be effectively passively stabilized by rotating a mass 200 in the refueling drogue 100 at a sufficient speed to produce a gyroscopic effect that will result in the refueling probe 100 being effectively passively stabilized as it is pulled through the atmosphere behind the refueling aircraft 1000. The resulting angular momentum may be harnessed to fix the drogue's orientation in space, thus stabilizing the drogue. Based upon the principle of gyroscopic motion, the amount of disturbance torque that the drogue can reject is directly related to the angular momentum of the rotating mass 200 (the greater the momentum, the greater the amount of disturbance torque the drogue 100 can reject), where angular momentum may be increased by increasing the spin speed and/or the polar moment of inertia (mass distribution) of the rotating mass. By rotating the mass 200, a sufficient angular momentum can be achieved so that the drogue 100 may sufficiently reject disturbance forces and thus effectively passively stabilizing the drogue 100. That is, the refueling drogue 100 tends to have a fixed orientation in space and is capable of effectively rejecting a disturbance moment (such as turbulence), thus, providing a substantially stable reference hose for the refueling drogue 100 due to the gyroscopic effect of the rotating mass. By "stabilized," it is meant that the disturbance response of the drogue 100 is significantly reduced. By way of example, the angular displacement of the longitudinal axis of the drogue 100 due to turbulence can be reduced. By "passively stabilized," it is meant that the refueling drogue 100 may be stabilized without the need of control surfaces or other surfaces such as rudders and/or elevators, that alter the orientation and/or position of the refueling drogue 100 (or more precisely, physically impart a force or moment on the refueling drogue to counter the effects of turbulence, etc., on the refueling drogue 100 to substantially fix its angular orientation in space).

In a first embodiment of the present invention, the refueling drogue 100 may be configured to harness an air stream 900 flowing past the refueling drogue 100 due to the forward velocity of the drogue 100 as it is dragged through the atmosphere to spin the rotating mass 200 to obtain the gyroscopic effect to passively stabilize the refueling drogue 100. Air stream velocities may be below 80 KEAS, 80 KEAS, 100 KEAS, 150 KEAS, 200 KEAS, 250 KEAS, 300 KEAS, 350 KEAS, 400 KEAS, or more, or any speed or range of speeds therebetween in increments of 1 KEAS, and is typically a function of the forward velocity of the refueling aircraft 1000.

Source of Rotation of the Rotatable Mass

In the first embodiment of the invention, the refueling drogue 100 includes an air turbine 300 that when exposed to the relative air stream, rotates the rotatable mass 200 as a result of the aerodynamic forces on the air turbine 300. In a first embodiment of the present invention, as shown in FIG. 1, air 910 from air stream 900 is inducted into the refueling drogue 100 and directed past the air turbine 300, which in some embodiments of the invention, may be configured much like a fan, and then exits the refueling drogue 100 out an exhaust port 130 and back into the air stream 900. Because the air turbine 900 is mechanically connected to the mass 200, (in the embodiment shown in FIG. 1, the air turbine is directly mounted on the rotatable mass 200) the rotation of the air turbine 300 is imparted onto the mass 200 which is supported by bearings 220, thus permitting the mass 100 to rotate about the centerline of rotation 210 of the rotating mass.

It is noted that some embodiments of the present invention can be practiced utilizing compressed air that is passed by the air turbine 300 to impart the rotation onto the rotating mass 200. Thus, in some embodiments of the invention, a ram air device may be utilized to compress the air to a sufficient degree such that when the air is permitted to expand in proximity to the air turbine 300, the air turbine rotates and a rotation is imparted onto the mass 200.

Figure 3:
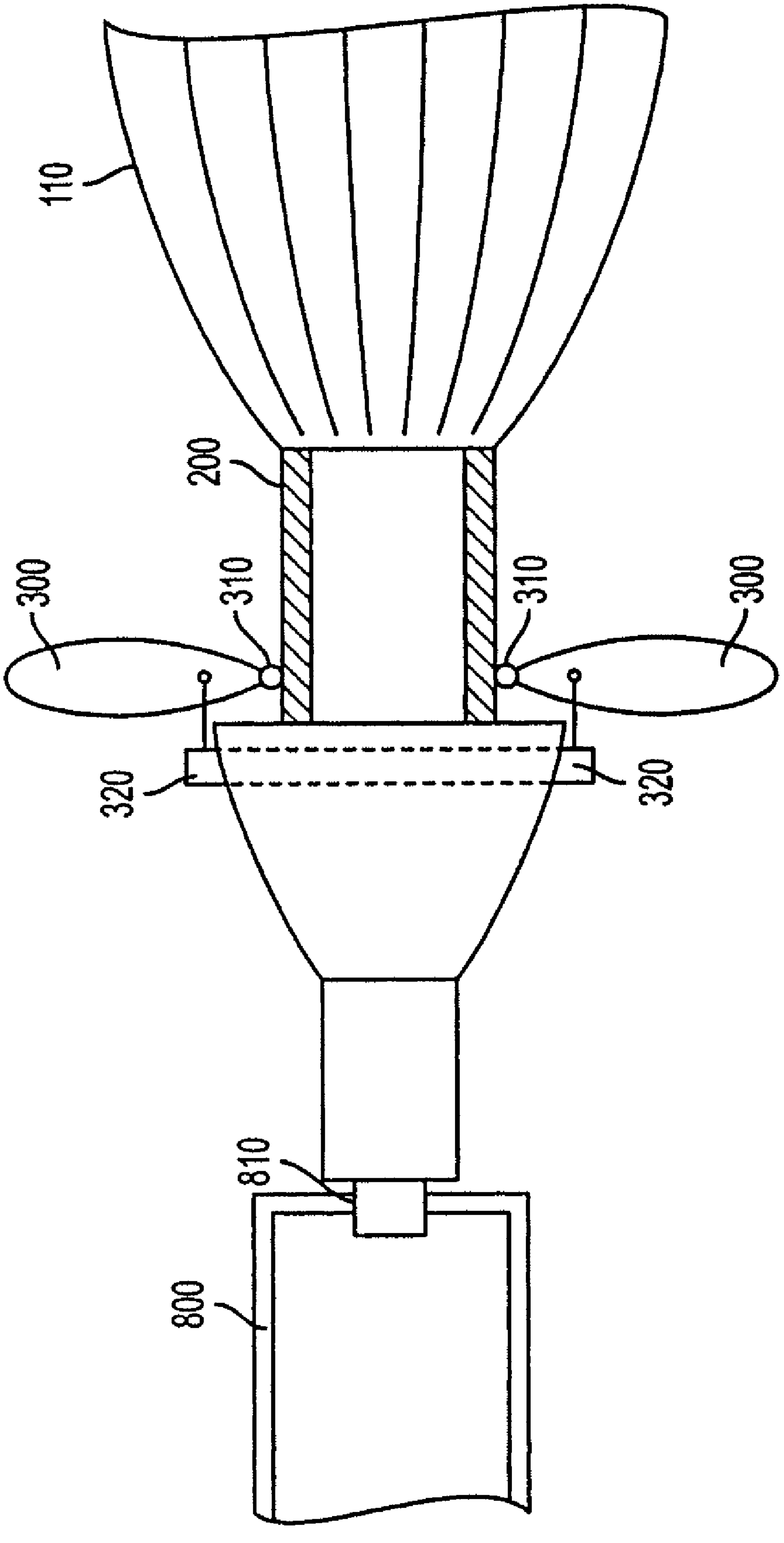
FIG. 3 shows another embodiment of the present invention.

As can be seen from FIG. 1, a first embodiment of the present invention may be practiced with the air turbine 300 inside the refueling drogue 100. That is, the air turbine in some embodiments of the invention may be internal to the refueling drogue 100 in a manner that is, by way of example, analogous to the turbine of a conventional jet engine. However, it is noted that in some embodiments of the present invention, as shown in FIG. 3, the air turbine 300 may be located on the outside the refueling drogue 100. Thus, in some embodiments of the present invention, the blades 300 can extend from the refueling drogue 100, as shown in FIG. 3. In yet further embodiments of the present invention, a portion of the air turbine 300 may be both located inside the refueling drogue and outside of the refueling drogue. In yet further embodiments, a plurality of air turbines may be used, some of which may be located inside the drogue 100 and some on the outside of the drogue 100.

In some embodiments of the present invention, the basket 110 that extends from the rear of the refueling drogue is configured such that the basket will rotate, thus imparting a rotation onto the body of the refueling drogue and/or the rotating mass 200 portion of the refueling drogue.

Figure 4:
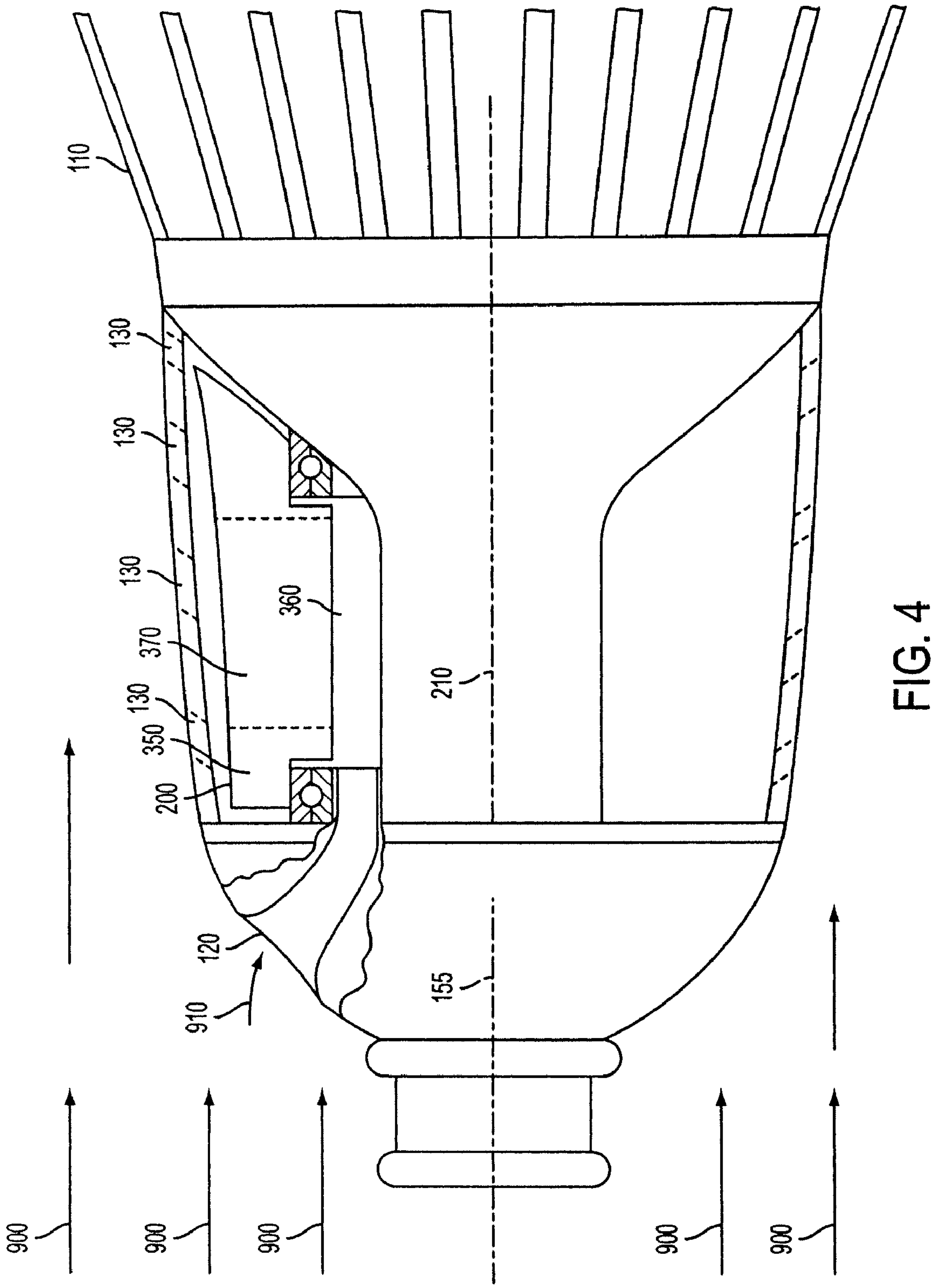
FIG. 4 shows yet another embodiment of the present invention.

It is noted that the present invention may be practiced with a variety of types of air turbines 300. In the first embodiment of the invention, as shown in FIGS. 1 and 3, the air turbine 300 can comprise a plurality of radially extending blades and/or vanes that serve to capture energy from the air stream 900/910 passing through the blades in a manner quite similar to the blades of a conventional bladed fan or windmill. However, in other embodiments of the present invention, the air turbine 300 can comprise a plurality of passages (holes, slots, spaces, bores, etc.) in a body, the air turbine 300 having a configuration such that when air is passed through the passages, a rotation is imparted on the air turbine 300. By way of example only and not by way of limitation, a air turbine 300 having a radial turbine configuration as shown in FIG. 4, may be used to practice the invention (as will be discussed in greater detail below). Some embodiments of the present invention may be practiced with any device that may enable energy to be extracted from an air stream to create a rotational moment that may be used to rotate and/or assist in rotating the rotating mass 200. Indeed, in some embodiments of the present invention, the air turbine 300 may comprise a disk having a plurality of angled bores through the disk at angles such that when air traveling in the axial direction towards the disk passes through the bores, a rotational moment is imparted on the disk, which then may be imparted on the rotating mass 200.

Figure 5A:
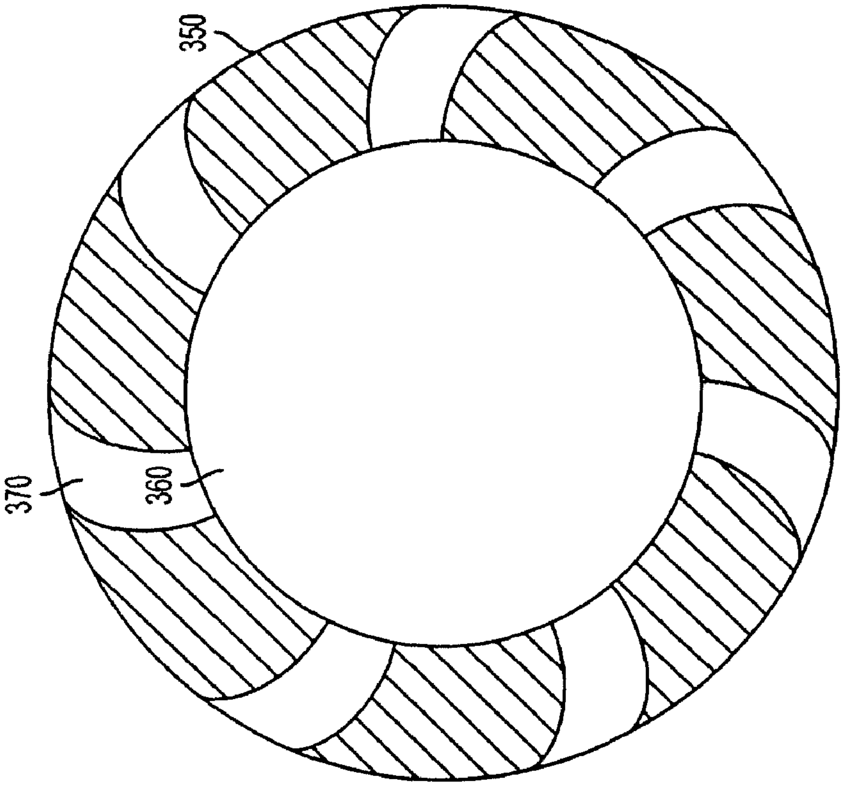
FIG. 5*a* shows a cross-sectional view of the component shown in FIG. 5.
Figure 5:
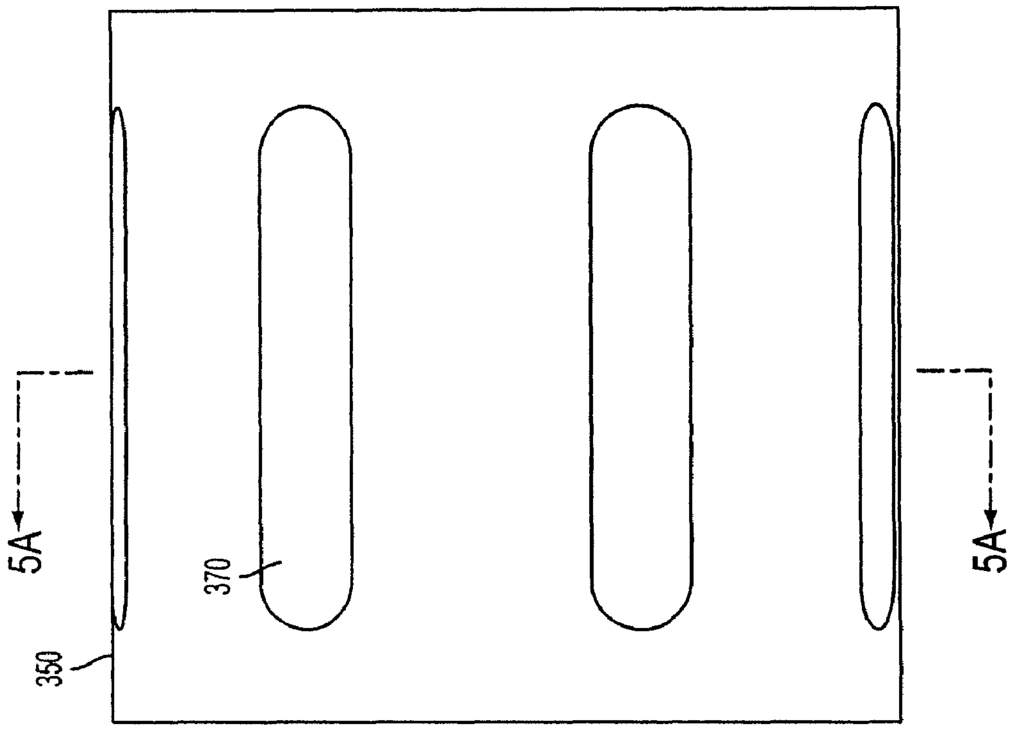
FIG. 5 shows a detailed view of a component of the embodiment shown in FIG. 4.

As mentioned above, a first embodiment of the present invention may utilize a radial turbine (which may be of a configuration commonly referred to as a squirrel cage) as the air turbine 300 to impart a rotation on the rotating mass 200. As can be seen from FIGS. 4-5, the radial turbine 350 may be aligned with its axis of rotation 210 parallel or substantially to the direction of the air stream 900. In the embodiment shown in FIG. 4, air 910 from the air stream 900 enters through air inlets 120 facing the air stream 900. This air is directed into a cavity 360 in the radial turbine 350. The air then passes through slots 370 in the radial turbine 350 and then through passageways 130 arranged axially around the exterior of the refueling drogue 100 leading to the exterior of the drogue 100. The configuration of the slots 370 in the radial turbine 350 and/or the configuration of the drogue 100 is such that passage of the air through the slots imparts a rotation onto the radial turbine. In a first embodiment, the slots 370 are spaced about every 18 degrees around the circumference of the radial turbine 350, although in other embodiments, the slots may be spaced differently.

In the embodiment shown in FIG. 4, the rotating mass 200 is the radial turbine 350. That is, the radial turbine 350 is of sufficient design (mass, geometry, etc.) such that as it rotates, it may produce a sufficient gyroscopic effect on the refueling drogue 100 sufficient to passively stabilize the drogue. However, it is noted that in other embodiments of the present invention, the radial turbine 350 may be mechanically connected to a separate rotating mass 200.

It is noted that in some embodiments of the invention, the air turbine 300 may utilize any type of surface/body that may extract mechanical energy from an air stream 900 flowing past the refueling drogue 100 (including the inducted air 910). Thus, in some embodiments of the present invention, the air turbine 300 may simply have a plurality of surfaces that, when exposed to an air stream 900 having a relative velocity to the refueling probe in excess of a certain value, are adapted to rotate and thus rotate the rotatable mass 200 as a result of aerodynamic forces on the surfaces. In some embodiments of the invention, these surfaces may be lifting surfaces (L/D greater than 1), may be drag surfaces (L/D less than 1), or a combination of lift surfaces and drag surfaces.

It is further noted that in some embodiments of the present invention, the air turbine 300 may utilize variable pitch surfaces/blades/vanes, etc., so that the pitch of the surfaces/blades/vanes may be changed, for example, to maximize the energy extracted from the air flow 900 and/or reduce drag, etc. Some embodiments of the present invention may be utilized by varying the aerodynamic geometry of the slots/protrusion/holes in the air turbine 300 as well. By way of example and not by way of limitation, shutters may be placed inside the slots of the radial turbine 350 and/or placed on the outside and/or on the inside of the radial turbine 350.

Still further, other embodiments of the present invention may utilize a device that varies the airflow 910 into the refueling drogue 100 and/or exiting the refueling drogue 100. Thus, some embodiments of the present invention may be practiced with any means that can be utilized to vary the amount of airflow/velocity past the air turbine 300. This may permit the angular speed and/or angular momentum of the turbine to be controlled. In some embodiments of the invention, the speed/momentum may be controlled from 0 revolutions per minute to a maximum value, which may be determined by the velocity at which the drogue In yet another embodiment of the present invention, any device that varies a physical property of the air 910 traveling into/through/exiting the refueling drogue 100 (e.g., mass flow, velocity, temperature, pressure, etc.) may be used to practice the invention.

It is noted that while the embodiments shown in the figures are depicted as having a air turbine 300 with a centerline of rotation 210 substantially parallel to the centerline 105 of the drogue 100 and/or the direction of air flow 900, other embodiments of the present invention can be practiced where the centerline of rotation 210 of the air turbine is not parallel to the just mentioned features. By way of example, the air inlets 120 might channel the air 910 in a direction normal to the direction of the air stream 900, and thus, in the case of a radial turbine, the radial turbine may have its centerline of rotation 210 normal to the direction of the air stream 900. In such an embodiment, gears might be utilized to connect the radial turbine to a rotating mass 200 if it is desirable that the centerline of the rotating mass be parallel to the centerline of the refueling drogue 100.

In some embodiments of the present invention, where the air turbine 100 extends away from the refueling drogue, as shown by way of example in FIG. 3, the air turbine 300 may be configured to retract towards the refueling drogue and extend outward from the refueling drogue such that the outer diameter of the air turbine 300 may be varied. In the embodiment shown in FIG. 3, the blades of the air turbine 300 may be mounted on hinges 310 and connected to actuators 320 such that the actuators may retract and/or extend the blades. Still further, the blades may also be extended by centrifugal force and retracted by, for example, using springs and/or an actuator and/or by shutting off the air turbine. Such an embodiment might be practiced in the case where the refueling drogue is retracted into the refueling aircraft 1000 and/or a containment vessel on the refueling aircraft 1000. In yet further embodiments of the present invention, the air turbine 300 may be configured to retract substantially completely inside the refueling drogue 100, while in yet further embodiments of the present invention, the air turbine 300 may be configured to retract completely inside the refueling drogue. In some embodiments of the present invention, the air turbine 300 may be configured to only retract a partial distance from its full outer diameter.

Some embodiments of the present invention will utilize a refueling drogue basket 110, as shown, for example in FIGS. 1 and 4. In some embodiments of the invention, the basket 110 comprises struts 112 that connect the canopy to a canopy and/or parachute 114, where the canopy and/or parachute 114 may provide additional passive stability to the drogue 100. This basket may help passively stabilize the refueling drogue 100 and/or enhance capture of the refueling probe 2100 due to the funneling effect of the basket. Still further, the struts 112 may serve to act as a final guide for the refueling probe into the socket of the refueling drogue 100. Additionally, the basket 110 may act as a lifting surface. Some embodiments of the present invention may be configured such that the air turbine 300 is configured that the outer diameter is less than the greatest exterior diameter of a refueling drogue basket 110 when the refueling drogue basket is fully deployed and/or substantially fully deployed. In such an embodiment, the refueling probe 2100 of the receiver aircraft 2000 and/or the receiver aircraft itself might be better protected because the refueling probe would more likely contact the exterior diameter of the refueling drogue basket 110 instead of contacting the air turbine 300.

It is noted that in some embodiments of the present invention, the harnessed air stream may be used in conjunction with another means of rotating the rotatable mass 200. That is, some embodiments of the present invention need not be practiced by rotating the mass 200 by exclusively harnessing the air stream relatively flowing past the refueling drogue 100. Indeed, other embodiments of the present invention can utilize a rotating mass that is rotated utilizing a means that do not include harnessing the relative air stream 900. By way of example, other sources of power may be used to rotate the mass 200. For example, hydraulic power, pneumatic power, electrical power (e.g., battery/rechargeable battery), magnetic power, chemical power (e.g., combustion), etc. may be used to rotate the rotatable mass 200.

Rotatable Mass

In some embodiments of the present invention, the refueling drogue may be adapted to be effectively passively stabilized when the rotating mass 200 rotates with a speed of about 1,000-20,000 revolutions per minute. In other embodiments of the present invention, the refueling drogue may be stabilized with a mass that rotates at a speed anywhere in the range of about 100 revolutions per minute to about 50,000 revolutions per minute, and any ranges therebetween in increments of 1 revolution per minute. In yet other embodiments of the present invention, rotation speeds may range from between about 3000 to about 10,000 and/or about 8,000 to about 15,000 revolutions per minute. It is noted that in some embodiments of the present invention, the gyroscopic effect may be increased by increasing the speed at which the rotating mass 200 rotates. In other embodiments of the present invention, the gyroscopic effect may be increased by increasing the mass that is rotated. In still further embodiments of the present invention, the gyroscopic effect may be increased by increasing the radial distance that the mass is positioned from the centerline of rotation 210 (which may be coaxial with the centerline of rotation of the air turbine 300) of the mass 200. Thus, the gyroscopic effect may be varied by varying the moment of inertia of the rotating mass 200. In yet other embodiments of the present invention, the gyroscopic effect may be increased by varying all of the just mentioned variables. It is further noted that in some embodiments of the invention, an increased gyroscopic effect may be obtained by increasing some of these variable and decreasing other of these variables. By way of example and not by way of limitation, some embodiments of the invention might be practiced by utilizing a relatively low mass that rotates at a high rotation speed. While in other embodiments of the invention, the mass might rotate at a relatively low rotation speed but be a relatively high radial distance from the centerline of rotation. Some embodiments of the present invention may be practiced with a rotatable mass 200 that comprises about 10% to about 20% of the total weight of the refueling drogue 100, although other embodiments may be practiced with rotatable masses that are below this range or above this range. Indeed, in some embodiments of the present invention, this range might be a minimum weight of the mass 200.

It is noted that the centerline of rotation 210 of the rotating mass 200, in some embodiments of the invention, may be coaxial with the centerline 105 of the drogue 100, while in other embodiments the centerline 210 may be parallel with the direction of the air stream 900, while in other embodiments the centerline 210 may past through the center of gravity of the refueling drogue 100. In yet other embodiments, the centerline 210 of rotation may be positioned in any orientation that will permit the rotating mass 200 to create a sufficient gyroscopic effect that will effectively passively stabilize the refueling drogue 100.

Figure 6:
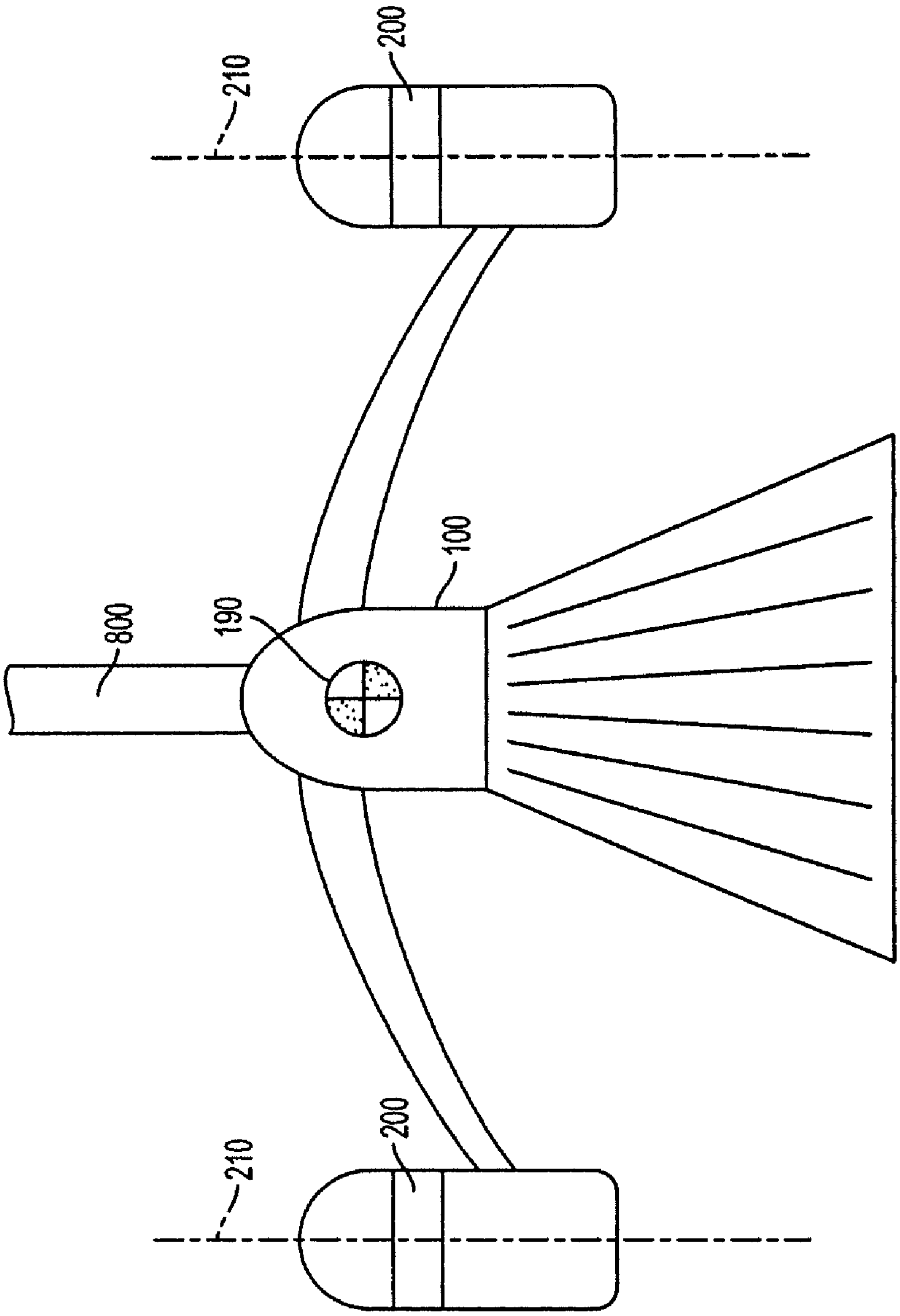
FIG. 6 shows yet another embodiment of the present invention.
Figure 7:
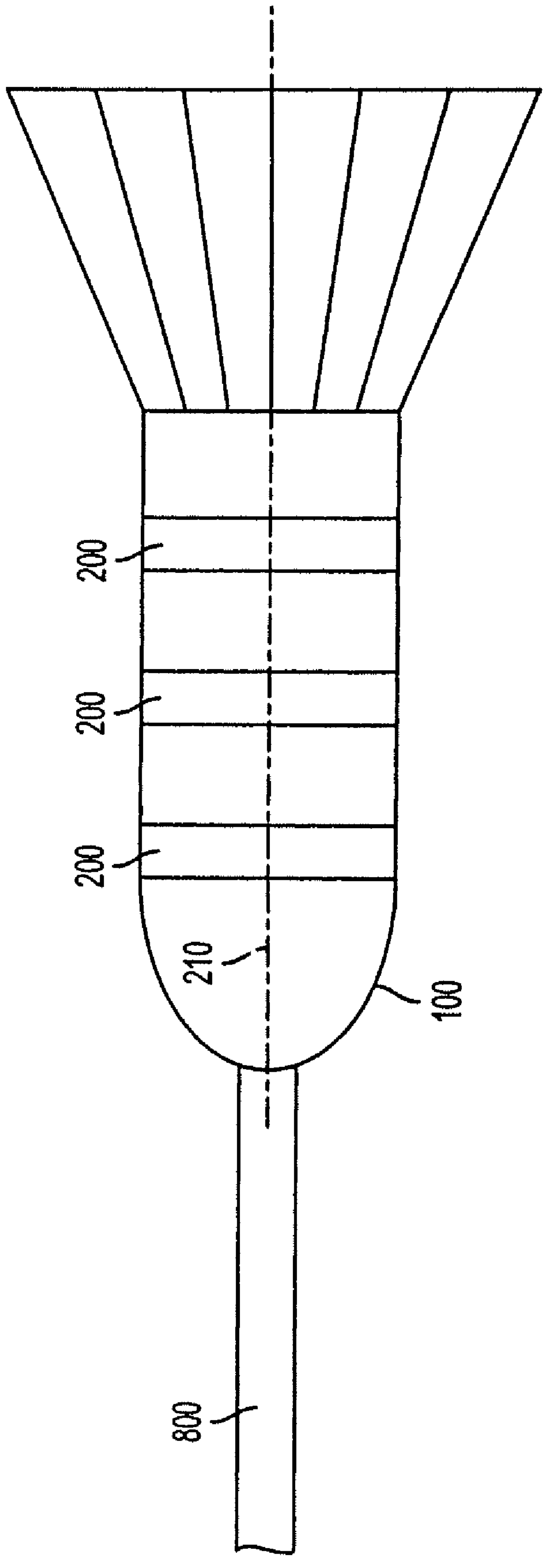
FIG. 7 shows yet another embodiment of the present invention.

Some embodiments of the present invention may include a plurality of rotatable masses 200, as can be seen in FIGS. 6 and 7, adapted to substantially stabilize the refueling drogue via a gyroscopic effect of the rotating masses 200. In one embodiment shown in FIG. 6, centerlines of rotation 210 of the rotating masses may be parallel to one another. In other embodiments, such as that shown in FIG. 7, the centerlines of rotation 210 of the masses 200 may be coaxially aligned. In other embodiments of the invention, respective centerlines of rotation of the rotating masses may be uniformly arrayed about the center mass 190 of the refueling drogue. However, other embodiments of the present invention can be practiced wherein the centerlines of rotation are not coaxial with one another and/or not parallel to one another and/or not arrayed about the center of mass 190. For example, the centerlines might be about the polar axis of the refueling drogue and about an axis orthogonal to the polar axis of the refueling drogue. In some embodiments, all the masses may rotate counterclockwise or clockwise. In some embodiments of the invention, any distribution of rotating masses 200 may be used if the drogue can be effectively passively stabilized.

Figure 8:
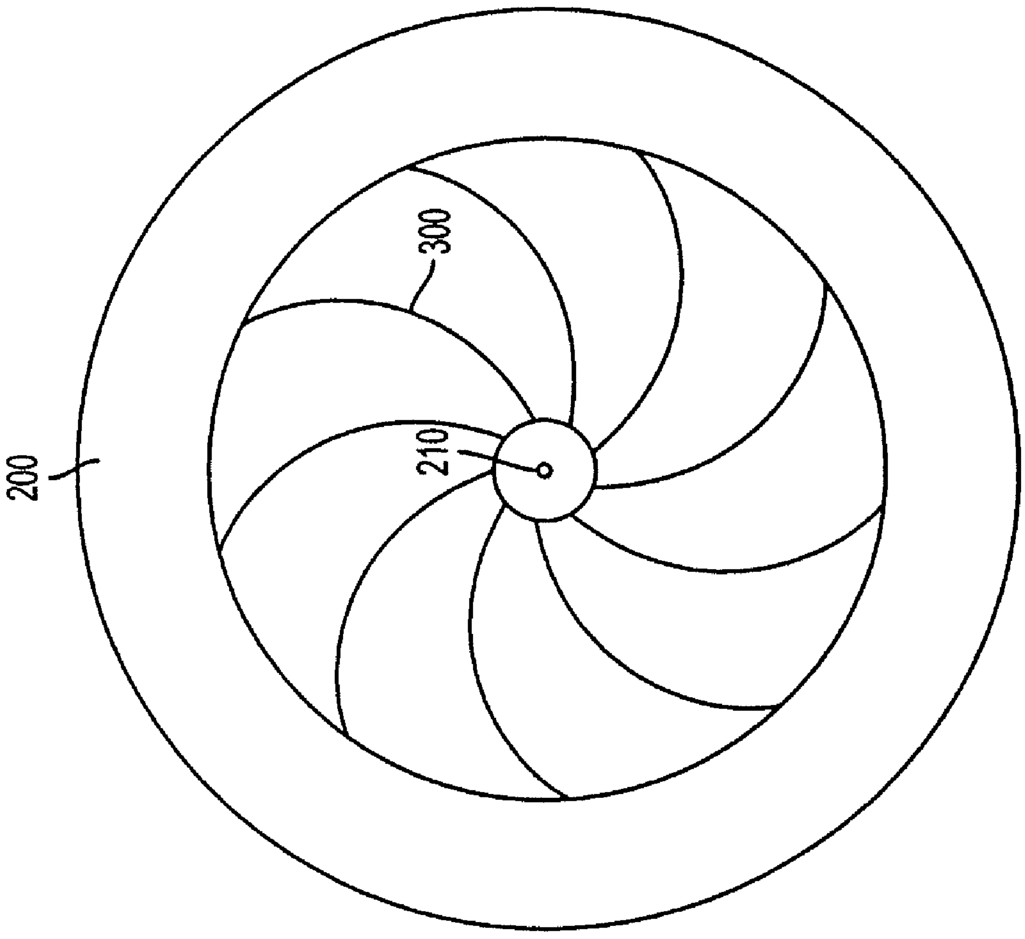
FIG. 8 shows yet another embodiment of the present invention.

It is noted that in some embodiments of the present invention, the air turbine 300 may be configured to support the rotating mass and/or at least partially support the rotating mass 200, as shown in FIG. 8. In some embodiments of the present invention, the air turbine-rotating mass combination may be located completely inside the refueling drogue 100 or partially inside or outside the refueling drogue 100 or completely outside the refueling drogue 100. Thus, in some embodiments of the present invention, the rotating mass 200 may be configured to have aerodynamic properties to be conducive to the flow of air in the air stream 900 over and/or across the air turbine-rotating mass combination.

Some embodiments of the present invention may be practiced by rotating the entire refueling drogue 100. In such an embodiment, the configuration of the refueling drogue 100 could be configured such that the spinning of the refueling drogue 100 produces a sufficient gyroscopic effect to effectively stabilize the refueling drogue 100. In some embodiments of the present invention, the entire refueling drogue body is configured to rotate about the refueling hose 800 or a component 810 that is connected to and/or is part of the refueling hose 800 and/or connected to and or is part of the refueling drogue 100 to permit the drogue 100 to rotate By refueling drogue body, it is meant the most or all of the drogue 100, and may or may not include, for example, the connector 810 that connects the drogue 100 to the refueling hose 800 and may or may not include the basket 110. Thus, in some embodiments of the present invention, the refueling drogue 100 includes an adapter or other component that will permit the refueling drogue to rotate relative to the refueling hose 800. In some embodiments of the invention, this may include an adapter positioned between the refueling hose 800 and the refueling drogue 100. However, in other embodiments of the present invention, the refueling drogue body may be prevented from rotating relative to the refueling hose so that, as noted above, the rotating mass 200 may be configured to rotate relative to the refueling drogue body and/or the refueling drogue basket 110. Other embodiments of the present invention might include rotating only the basket 110.

Figure 11:
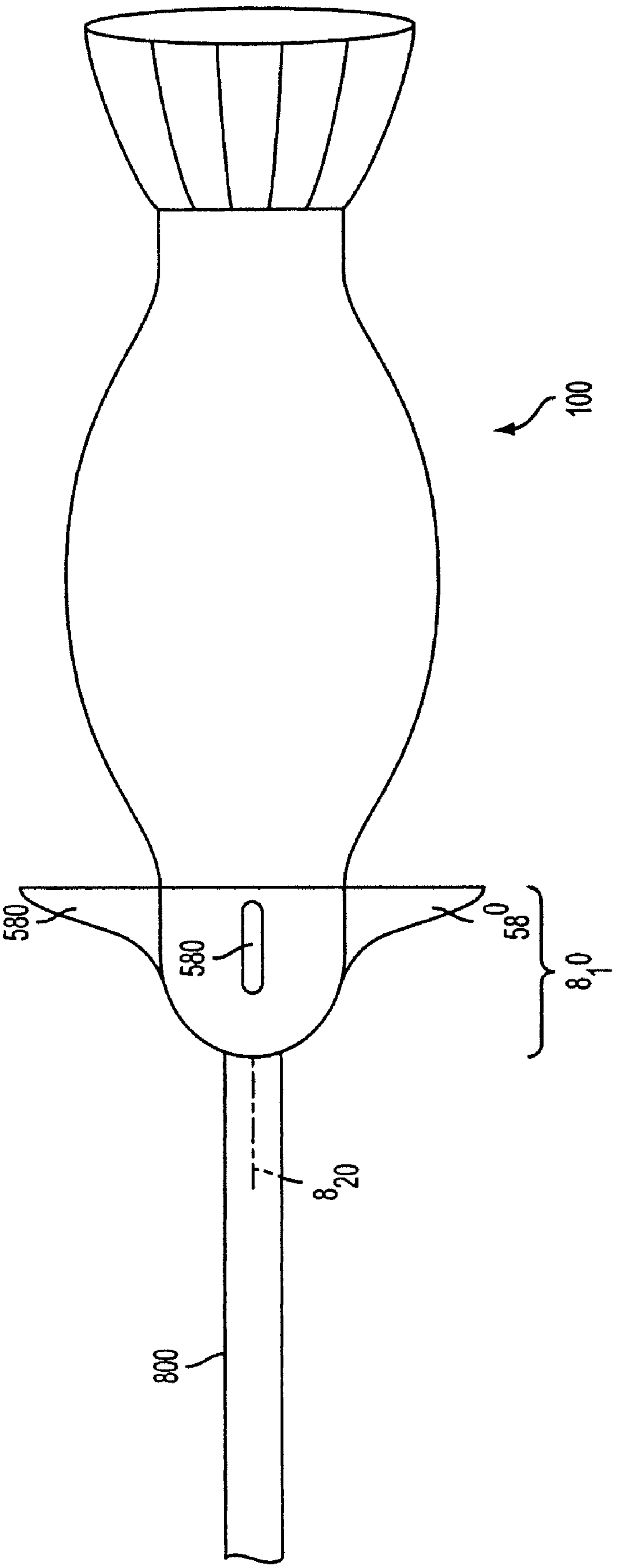
FIG. 11 shows yet another embodiment of the present invention.

Another form of passive stabilization which may reduce the amplitude of the response of the lateral displacement of the drogue 100 to turbulence may be achieved by installing aerodynamic surfaces 580 as shown in FIG. 11 on the refueling hose/drogue connector 810 and/or on the hose 800 and/or on the body of the refueling drogue 100. It is believed that these surfaces may provide a similar type of damping force as that obtained by a horizontal and/or vertical stabilizer on a conventional aircraft. In a first embodiment, these surfaces may be placed in pairs which, in some embodiments, are placed orthogonal to each other. In one embodiment, the surfaces lie in planes that intersect or substantially intersect the axis 820 of the refueling hose 800 (and/or an extended axis of the refueling hose 800). In some embodiments, the surfaces may be aerodynamically shaped and may be capable of being retracted for stowage. It is noted that these surfaces may be located on the refueling hose 800 and/or on the connector portion 810 and/or on the drogue 100 body.

Active Control

Figure 9:
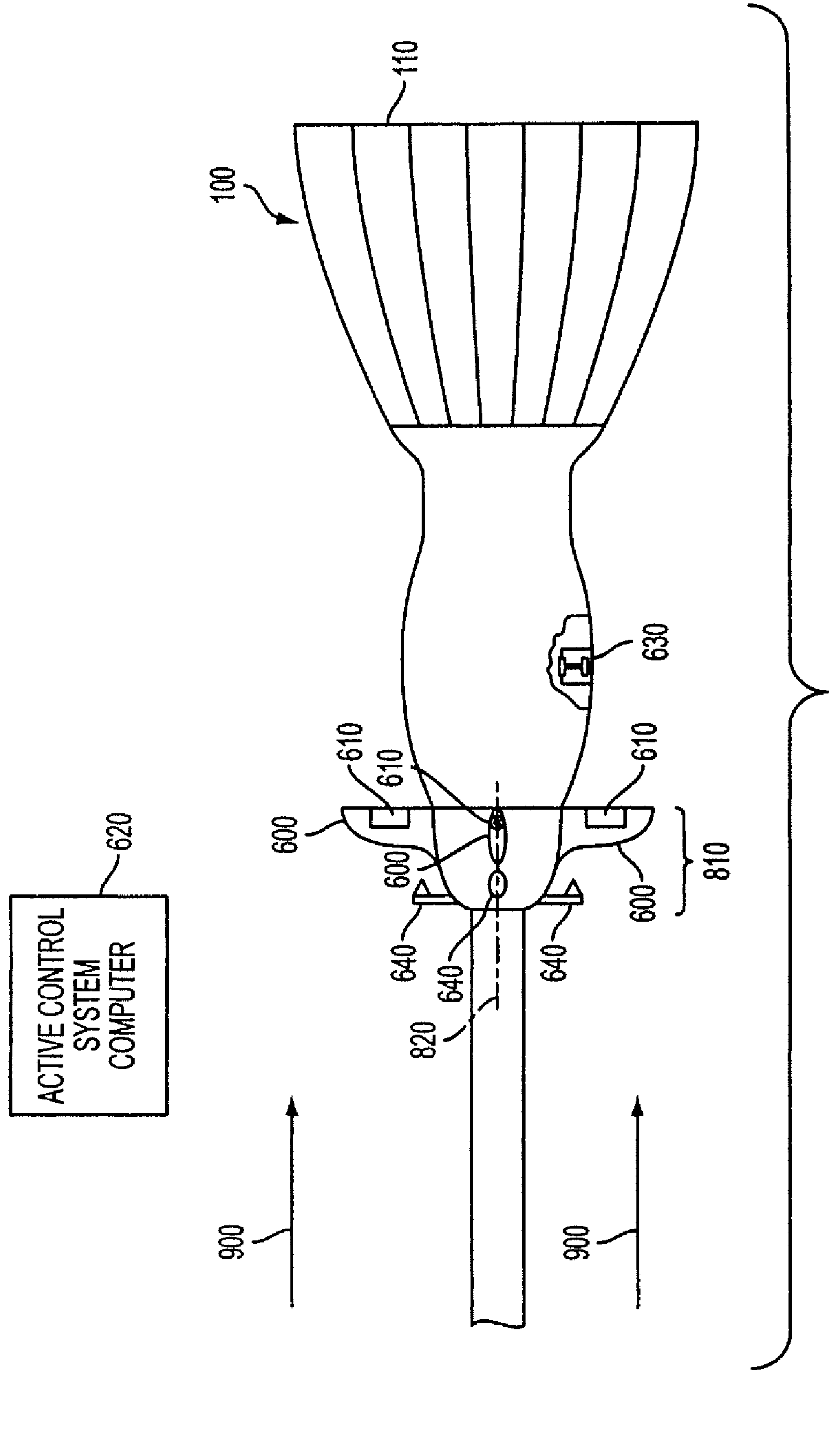
FIG. 9 shows yet another embodiment of the present invention.

As noted above, the present invention utilizes the spinning motion of the rotatable mass 200 to effectively passively stabilize the drogue 100. However, other embodiments of the present invention may be utilized with an active control system that actively controls the refueling drogue about an arbitrary selectable reference line. By active control, it is meant a control system that may impart forces on the drogue 100 and/or the hose 800 to control/regulate the location of the refueling drogue 100 and/or the hose 800. In some embodiments, the force may be orthogonal to the velocity of the air stream. In some embodiments, it may be used to established a substantially fixed position of the drogue with respect to the refueling aircraft. Active control may additionally suppress lateral translations of the drogue 100 and/or the refueling hose 800 in response to disturbances/turbulence. In such embodiments, the effect of spinning the rotatable mass 200 may be combined with actively controlling the motion of the drogue 100. Active control may be practiced, in some embodiments of the present invention, to counteract the effects of wind gusts and/or cross winds, etc. (typically moderate to high frequency gusts/cross-winds) that may affect the relative position of the refueling drogue 100, for example, in relation to the refueling aircraft and/or the velocity vector through the air. In a first embodiment of the invention implementing an active control system, as shown in FIG. 9, the active control system includes a plurality of control surfaces 600 which may include movable portions 610 which may be driven by actuators controlled by an active control system computer 620, which in some embodiments of the present invention, may be located in the refueling aircraft 1000, while in other embodiments of the present invention, may be located on the refueling drogue 100, and in further embodiments of the present invention, may be spaced between both places. In the first embodiment of the present invention, the movable surface 610 are movable tabs that function in a similar matter to an aircraft elevator and/or rudder. In some embodiments, the control surfaces 600 may be as according to U.S. Pat. No. 2,582,609, the contents of which is incorporated herein in its entirety. It is further noted that the active control system might include additional control surfaces as well, such as control surfaces 1600 that may include movable portions 1610, such as that shown in FIG. 12.

It is noted that while the active control system of the present invention is described in terms of maintaining a "fixed" or "desired" orientation of the refueling drogue and/or maintaining a "fixed" or "desired" position/angle of the refueling drogue, which might be a reference angle and/or a reference position, etc., the active control system, as would be readily understood by one of ordinary skill in the art, in actuality, returns the refueling drogue 100 to its position prior to being displaced due to disturbances and/or substantially minimizes what otherwise would be a large displacement. That is, the refueling drogue, in some embodiments of the present invention, will not be able to maintain a "fixed" position or a "desired" orientation, but will instead be able to return the drogue to the drogue's prior position/orientation/angle quickly enough and/or to minimize the displacement of the drogue 100 such that the refueling drogue may be actively controlled. In one embodiment of the present invention, the active control system reduces the translational movements of the drogue 100 in response to a disturbance such that most or all of the displacement of the drogue is minimal enough that displacement of the drogue 100 does not interfere with aerial refueling and/or create a hazard to the aircraft being refueled. In some embodiments of the invention, disturbances or oscillations are a result of atmospheric turbulence and/or the bow wave effect and/or an impact of the drogue by a refueling probe of a receiver aircraft while attempting to dock with the drogue.

The active control system may be configured so that the position of the drogue may be maintained to a substantially fixed orientation relative to the refueling aircraft 1000 or another reference point. In some embodiments, the orientation may be maintained in moderate turbulence, to within about twelve inches, while in other embodiments the orientation may be maintained within six inches, and in still further embodiments, the orientation may be maintained to within a few inches. It is noted that in some embodiments of the present invention, how tightly the position of the refueling drogue 100 may be maintained is a function of the size and/or the configuration of the refueling drogue 100, such that configurations of some refueling drogues will be more conducive to position maintenance than others. Thus, the just mentioned numbers may vary upward and/or downward, depending on the configuration of the refueling drogue utilized to practice the invention.

In a first embodiment of the invention, the control surfaces 600 are located in pairs such that the pairs are substantially orthogonal to one another as shown in FIG. 9, although in other embodiments of the present invention, the control surfaces need not be orthogonal. In some embodiments of the invention, the control surfaces are located, when the drogue 100 is in a steady level flying condition and not rotating, in a vertical plane (i.e. a plane lying parallel to the direction of gravity and parallel to the direction of the air stream 900) and in a horizontal plane (as judged from the horizon). However, in other embodiments of the present invention, the control surfaces may be located in planes other than the just mentioned planes. By way of example and not by limitation, the control surfaces 600 may form a canted cross shape such as that shown in FIG. 15 when viewed down the longitudinal axis of the refueling drogue 100. Thus, some embodiments of the present invention may be practiced with orthogonal control surfaces located in various orientations about the refueling drogue. Still further, as noted above, other embodiments of the present invention may be practiced with control surfaces that are not orthogonal to each other. By way of example and not by limitation, the control surfaces 600 may form an X shape when viewed down the longitudinal axis of the refueling drogue 100. Indeed, in other embodiments of the present invention, three control surfaces may be used. Such an embodiment might form a Y shape (where the "leg" and "arms" of the Y are equal in length and spaced equally and/or where they are not equal in length/size and/or not spaced equally). It is noted that it is believed that in some embodiments of the present invention, orthogonal control surfaces may make implementation of the active control system according to the present invention easier, as the non-orthogonal control surface arrangement may require the control system to account for the non-orthogonality of the surfaces.

It is noted that in some embodiments of the present invention, the active control system can be configured to actively control the refueling drogue 100 for substantially any rotation angle of the refueling drogue, and thus the control surfaces, from the just described horizontal plane and/or the vertical plane. Some embodiments may utilize a sensor 630 to measure the rotation angle γ of the refueling drogue with respect to a fixed direction (such as the direction of gravity), and thus the rotation angle γ of the control surfaces 600 with respect to the fixed direction. Some embodiments may utilize a micro electrical mechanical system accelerometer triad and its associated electronics in order to resolve the rotation angle γ. By way of example and not by way of limitation, a pendulum-like gravity vector sensor may be utilized as the vector sensor 630. In other embodiments of the present invention, a gyroscope may be utilized to determine the rotation angle of the refueling drogue 100, etc. Still further, in other embodiments of the present invention, any device that may be used to determine the rotation angle of the refueling drogue so that the control surfaces may be utilized to actively control the refueling drogue, may be utilized to practice the present invention. By way of example, a shaft encoder might be used. Thus, as the refueling drogue rotates, the orientation of the control surfaces 600/610 with respect to the horizontal and vertical planes and/or any other appropriate reference axis can be determined, and movements of the control surfaces can be adjusted accordingly.

One embodiment of the present invention may utilize the active control system to change the vertical and/or horizontal position of the refueling drogue. In some embodiments of the present invention, the active control system may permit the refueling drogue 100 to maintain a substantially fixed orientation relative to the refueling aircraft 1000 when the refueling aircraft is flying at substantially constant altitude of air speed and/or heading. However, other embodiments of the present invention may be utilized to maintain a substantially fixed orientation of the drogue 100 relative to the refueling aircraft, even thought he refueling aircraft is not flying at a substantially constant altitude, air speed, and/or heading.

An embodiment of the present invention that utilizes the active control system may be configured to regulate the location of the refueling drogue 100 based on measured angles between an axis 820 through the center of the refueling hose/line 800 at a location where the refueling hose connects to the drogue 100 and a reference axis. This reference axis may be based on, for example, the direction of gravity and/or the direction of air flow V of the air stream 900. In other embodiments, this reference axis may be based on the control surfaces 600/610 of the refueling drogue.

Figure 13:
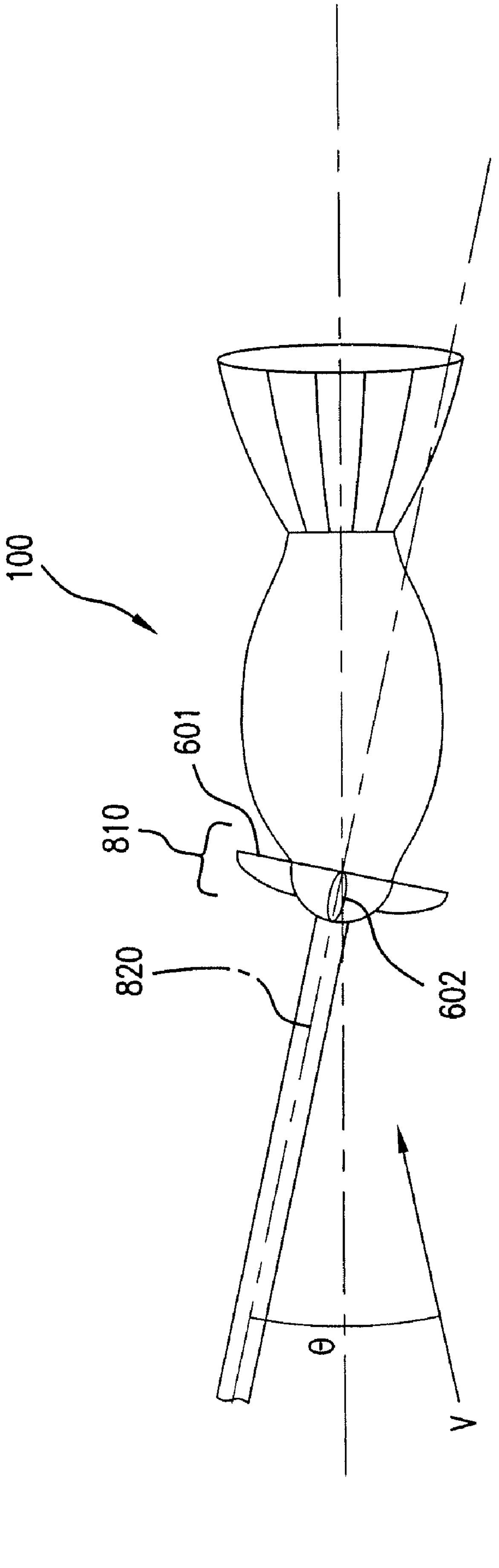
FIG. 13 shows the orientation of the axis of the refueling hose with respect to the velocity vector of the airstream as seen from one reference point.
Figure 14:
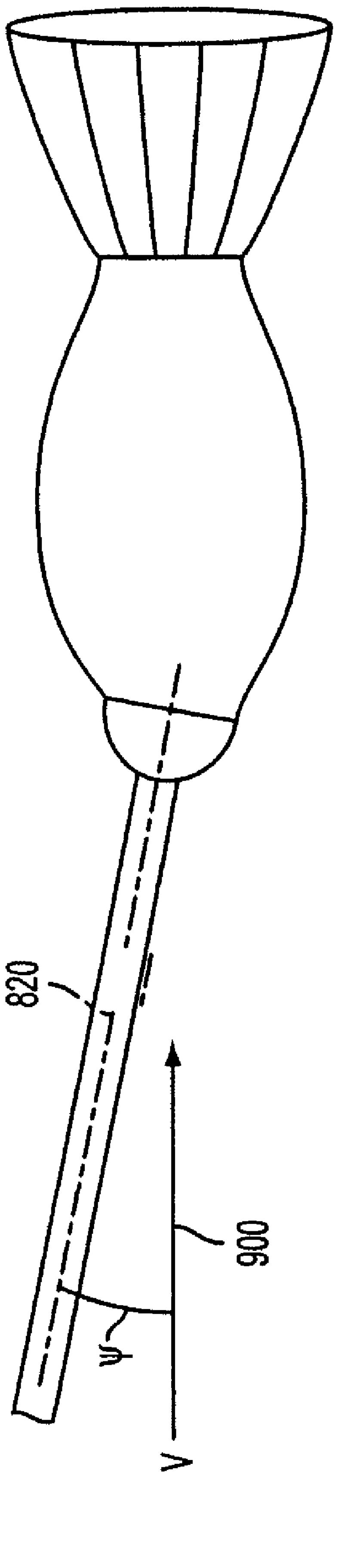
FIG. 14 shows the orientation of the axis of the refueling hose with respect to the velocity vector of the airstream as seen from another reference point.
Figure 15:
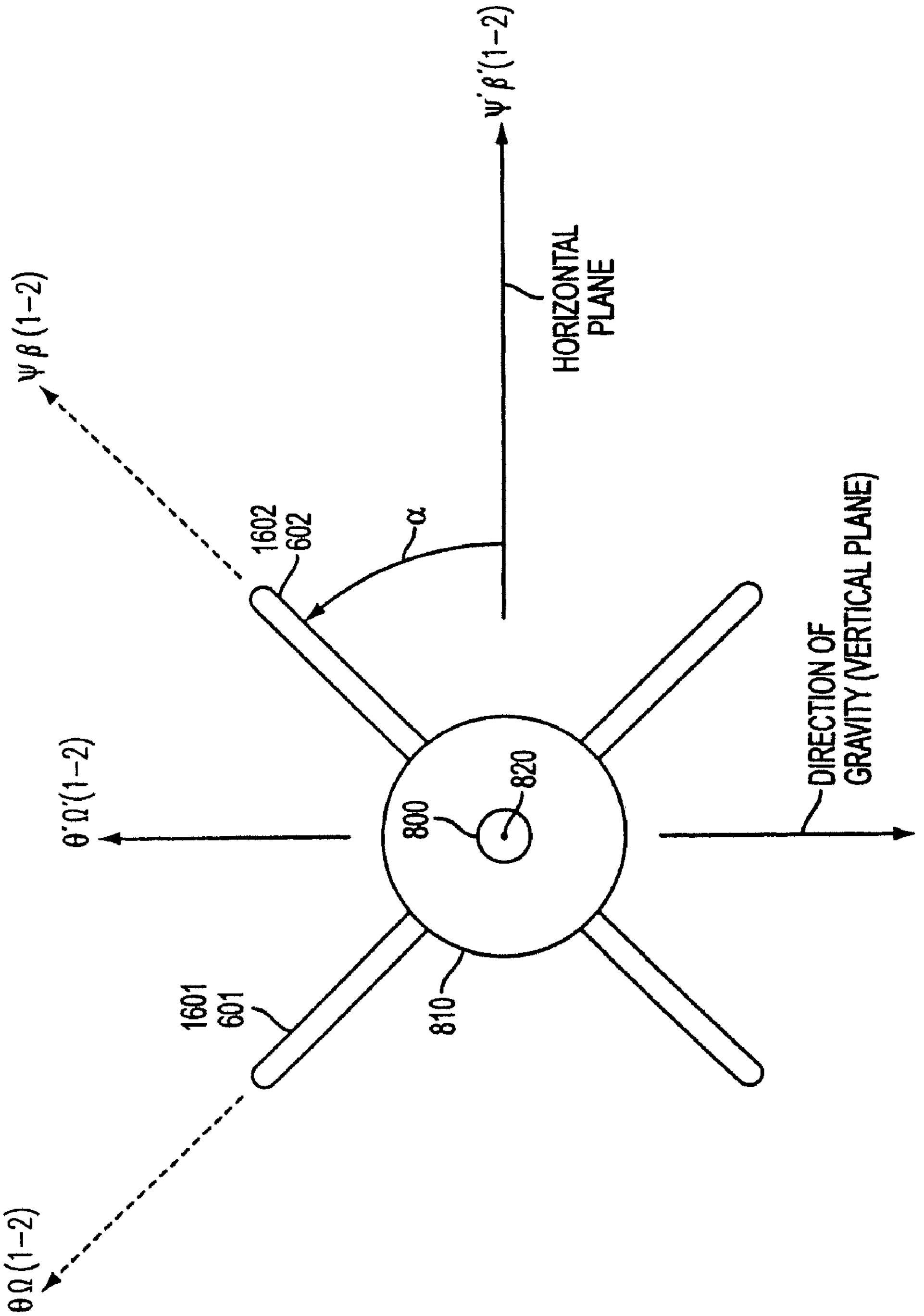
FIG. 15 shows the orientation of the control surfaces of the drogue 100 as seen when looking down the axis of the drogue 100.

In a first embodiment of the present invention, two angles are measured in planes orthogonal to one another, the angles being measured in reference to control surfaces 600. The first angle, θ, represents the angle between the axis 820 of the refueling hose and the velocity vector V in the plane of a control surface, which, in FIG. 15, is control surface 601, while the second angle, ψ, represents the angle between the axis 820 of the refueling hose and the velocity vector V in the plane of a control surface, which, in FIG. 15, is control surface 602, hose. This can be seen in FIGS. 13 and 14, thus showing the angle θ of the refueling hose 800 relative to the direction of air flow V, while FIG. 14 shows the angle, ψ, of the refueling hose 800 relative to the direction of air flow V. However, it is noted that other embodiments of the present invention may measure angles that are not orthogonal to one another and/or not in the just mentioned planes and/or not in the planes of the control surfaces. It is further noted that in some embodiments of the present invention, the refueling hose 800 may rotate with the refueling drogue 100 and/or independently of the refueling drogue. By utilizing a rotation sensor, such as that described above, the rotation angle γ of the refueling hose 800 at section 810 may be determined relative to the reference axis, as exemplary depicted in FIG. 15.

Still further, by determining this rotation angle γ, the measured angles θ and ψ may be converted to a refueling hose 800 pitch angle θ' and a refueling hose yaw angle ψ', via standard coordinate transformation, as can be readily seen from FIG. 15. Thus, because the displacement of the drogue relative to the refueling aircraft is proportional to the pitch and yaw angles of the refueling hose, the displacement of the drogue 100 may be controlled by regulating the pitch and yaw angles based upon measurements of angles θ and ψ. Again, it is noted that while the embodiment depicted in FIG. 15 shows the angles and the control surfaces in orthogonal relationship to one another, other embodiments may be practiced where they are not in orthogonal relationship to one another.

This embodiment may be understood by relying on the phenomenon that, because the portion of the refueling hose 800 on the end that attaches to the refueling drogue 100 can be considered a quasi-rigid body, the orientation of the axis 820 through the center of the refueling hose 800 at the point where the refueling hose connects to the refueling drogue 100 will change in proportion to changes in at least the location of the refueling drogue 100. Thus, the lateral displacement of the drogue relative to the refueling aircraft is proportional to the angles θ and ψ of the axis of the hose, as discussed above. Consequently, this displacement may be controlled by regulating the angles θ and ψ based upon their measurements. This is somewhat analogous (although this embodiment should not be considered limited by the analogy) to determining the position relative to the towing boat of a water skier based on the angle of the rope.

The angles θ and ψ of the centerline 820 of the refueling hose 800 may be measured on any two respective planes, providing that there is a way to link the orientation of the planes to the orientation of the control surfaces of the refueling drogue 100 so that the active control system can adjust the control surfaces to regulate the position of the drogue 100. Again, it is noted that in some embodiments of the present invention, the angles θ and ψ of the refueling hose 800 may be measured on planes orthogonal to the planes on which the control surfaces that regulate those angles lie. In some embodiments, this may permit the location of the drogue 100 to be regulated without reference to the horizontal plane and/or the vertical plane. In yet other embodiments, angles measured in any plane that will allow the active control system to regulate the location of the refueling drogue 100 may be used to practice the invention.

It is noted here that when utilizing the term "measured," the term includes determining the angle utilizing sensors located on the planes on which the angles lie as well as sensors located elsewhere and utilizing a coordinate transformation to measure the angle at the planes.

In a first embodiment of the present invention, the control system is configured to substantially maintain the angle θ and/or the angle ψ of the axis 820 of the refueling hose 800 at respective constant reference angles, and thus the control system may be configured to substantially maintain the pitch angle θ' and/or the yaw angle ψ' of the axis 820 of the refueling hose 800 at respective constant reference angles. In some embodiments of the present invention, the reference angle of the yaw angle ψ' of refueling hose axis 820 is zero degrees or substantially zero degrees from the vertical plane, although it could be other angles as well. In contrast, an embodiment of the present invention may utilize a pitch angle that is a non-zero angle from a reference plane corresponding to the horizontal plane, as well as a zero degree angle or substantially zero degree angle. That is, the axis 820 of the refueling drogue hose 800, in some embodiments of the present invention, typically has a non-zero pitch angle due to the effects of gravity and/or the aerodynamic forces on the refueling drogue at steady level flight and/or the bow wave effect from the receiver aircraft, and thus the pitch angle θ' of the refueling hose axis may be a non-zero angle. Still further, in some embodiments of the present invention, the pitch angle maintained by the control system may be purposely variable from the angle that would normally result from aerodynamic forces and/or the effects of gravity. By way of example and not by way of limitation, when refueling rotary wing aircraft, the pitch of the refueling hose axis may be adjusted to, for example, "lower" the position of the refueling drogue 100 from the position that it might otherwise be located, to, for example, ensure that there is enough clearance between the refueling hose and/or drogue and the rotors of the rotary wing aircraft. In such an embodiment, the present invention may be practiced to achieve the same result and/or the similar result as is achieved by practicing the concept of a variable speed drogue. Still further, some embodiments may be practiced where the position of the drogue 100 may be controlled in a manner that is not dependent on the speed of the drogue 100 through the air, at least for speeds at and above the speed at which the refueling aircraft 1000 must fly to maintain altitude and/or maintain a sufficient horizontal extension of the refueling hose 800. By way of example, at speeds above about 60 KEAS. In some embodiments of the present invention, the active control system may be utilized to practice the invention with any components or systems that will enable angles θ and ψ the axis of the refueling hose to be substantially controlled. In yet further embodiments, the present invention can be practiced with any device/system that will permit the position of the drogue 100 to be substantially controlled.

According to a first embodiment of the present invention, as noted above, active control of the refueling drogue to maintain a given position is achieved by controlling angles of the axis of the refueling hose 800 with respect to a reference axis. Such a reference axis, as noted above, might be determined based on the direction of the air stream 900. Thus, some embodiments of the present invention may be practiced with sensors 640 that are configured to measure an angle between the axis of the refueling hose 800 and a direction of an air stream 900 flowing past the refueling drogue, thus measuring the angles θ0 and ψ of the refueling hose axis 820. In the first embodiment of the present invention, the sensors 640 may be angle of attack/side slip sensors. In the first embodiment of the invention, these sensor 640 are positioned to measure θ0 and ψ of the refueling hose axis 820 at a refueling hose/drogue connector 810, which, in some embodiments of the present invention, is configured to permit portions of the main body of the refueling drogue 100 (e.g., the portions aft of the connector 810) to pivot. It is noted that the connector 810 is rigidly mounted to the refueling hose 800, and thus may be part of the refueling hose 800 and/or part of the body of the drogue 100. Still further, because the connector 810 is rigidly mounted to the refueling hose 800, a reference axis of the connector 810 can be correlated to the centerline 820 of the refueling hose 800, and thus measurements of the angles θ and ψ of the connector 810 can be used to measure θ and ψ of the centerline 820 of the refueling hose 800. That is, in some embodiments of the invention, the sensors may be positioned anywhere that will permit the angles θ and ψ to be measured, whether those sensors be on the refueling hose, the connector to the refueling hose, or the body of the refueling drogue.

In a first embodiment, the connector 810 is configured to permit the main body of the drogue 100 to freely pivot about the axis of the refueling hose 800 within a range of (when measured from, for example, the centerline 105 of the refueling drogue), such as by way of example, a cone of about 5 degrees, a cone of about 10 degrees, a cone of about 20 degrees, a cone of about 30 degrees, 40 degrees, 50 degrees, 60 degrees, 70 degrees, 80 degrees and/or 90 degrees, and/or any cone having an angle there between in about 0.1 degree increments. Thus, in some embodiments of the invention, the pitch and/or yaw angles of the refueling drogue 100 may be independent of the pitch and/or yaw angle of the axis 820 of the refueling hose 800.

In the first embodiment, these sensors comprise a rotary vane and shaft that pivots. The vanes extend into the air stream 900 and are aligned, during operation, by aerodynamic forces to lie parallel to the air speed velocity vector. The shaft of the vanes is connected to an angle sensor such as, by way of example, a rotary potentiometer. In some embodiments of the invention, the sensors 640 may output an analog electrical signal that may be used to determine angular deviation from a desired θ and ψ angle. In the first embodiment of the invention, the sensors 640, or more specifically the vanes of the sensor 640, are located such that they are substantially orthogonal to one another. Thus, in the first embodiment, of the present invention, the active control system computer 620 is configured to receive signals from the sensors 640 and analyze these signals and determine what corrective control signals should be outputted to actuators of the control surfaces 600/610 to return the refueling drogue 100 to the desired pitch angle and/or yaw angle.

It is noted that in other embodiments of the present invention, an inertial measurement unit might be utilized to provide the necessary data to control the refueling drogue.

It is been found that displacement of the refueling drogue may be determined from the angles θ and ψ of the axis 820 of the refueling hose 800. These displacements may be proportional to the yaw angle and the pitch angle. This may be determined mathematically utilizing an algorithm based on the following equations:

$$y=f(\theta'), \text{ and}$$

$$z=g(\psi'),$$

where y=a distance in the plane in which the angle θ' lies,
z=a distance in the plane in which the angle ψ' lies,
θ'=the pitch angle of the refueling hose, and
ψ'=the yaw angle of the refueling hose, where f and g are functions that describe the relation between y and θ' and z and ψ', which in some embodiments may be related to the length of the refueling hose. Thus, the lateral positions of the drogue 100 can be controlled by regulating θ' and ψ'.

Figure 20:
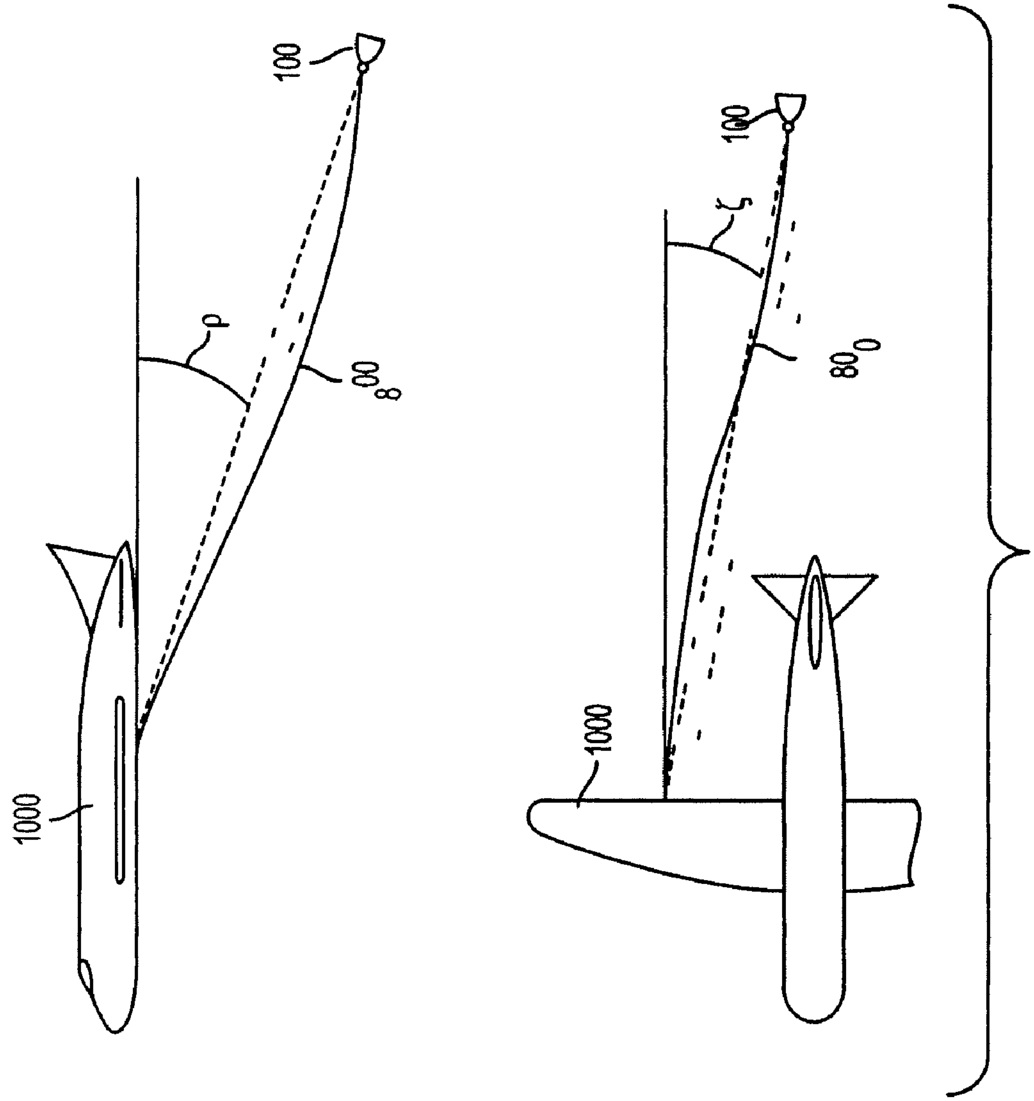
FIG. 20 shows another embodiment of the invention, where the location of the refueling drogue is determined based on angles between the refueling aircraft and the refueling drogue.

In another embodiment of the present invention, the drogue 100 position may be measured relative to the refueling aircraft via a sensor and/or a plurality of sensors located on the refueling aircraft. These sensor(s) may be located on a refueling drogue containment vessel, and may be microwave or optical sources that scan, in some embodiments continuously, over a region which, in some embodiments, is a conical region behind the refueling aircraft and/or behind a location of the containment vessel, as shown in FIG. 20. The position of the drogue may be determined by detecting a signal reflected from the drogue, which may be from a corner reflector and/or a transponder. In other embodiments, the drogue may generate the signal.

A three dimensional position of the drogue may be determined by receiving the reflected (and/or generated) signal from the drogue. The position information may then be used by the active control system to regulate the position of the drogue and/or to suppress unwanted lateral motion of the drogue. The position of the drogue may also be determined utilizing the instantaneous angular position of the drogue with respect to the refueling aircraft. That is, as shown in FIG. 20, angles ρ and ζ may be determined and, based on the length of the hose 800, the drogue's position may be determined. Such angles may be determined utilizing a receiver on the drogue and/or on the refueling aircraft that demodulates a signal to obtain information regarding its position. In some embodiments, a carrier signal generated from the drogue and/or the refueling aircraft is modulated with a signal that is indicative of the instantaneous angle from a reference plane (which may be vertical or horizontal), the drogue and/or the aircraft detects a maximum of the carrier signal indicating that the beam is pointing at the drogue and/or aircraft at that instance, the receiver demodulates the carrier at that point, the demodulated signal being indicative of the angle measured from the reference plane. In another embodiment, the distance may be determined based on a signal in the carrier signal based on the hose length. Based on the angles and the distance, the location of the drogue can be determined. Based on the position of the drogue, the active control system and/or the autonomous docking system may regulate the movements of the drogue. Thus, it will be seen that some embodiments of the active control system and/or the autonomous docking system (discussed in detail below) may be practiced with any means that will allow the position of the refueling drogue relative to the refueling aircraft to be determined. Still further, in some embodiments, a GPS and/or a DGPS (differential GPS) may be used to determine the position of the refueling drogue. It is further noted that the drogue position may be measured by sensors that may be on the refueling aircraft and/or may be on the drogue, and the drogue's position may then be communicated to the refueling drogue's control system. Additionally, it is noted that while in FIG. 20, angles ρ and ζ are shown measured from the point at which the hose 800 contacts the aircraft to the point at which the hose 800 contacts the refueling drogue, other embodiments could measure these angles from different points, and using a coordinate transformation, determine the location of the drogue.

That is, in some embodiments the present invention, the active control system computer 620 may be utilized to determine displacement and/or the relative location of the refueling drogue based on the measured angle θ and/or ψ' of the refueling hose 800. Thus, in some embodiments, the position can be utilized to control the drogue 100 so that it will maintain a desired position. Still, it is noted that in some embodiments of the present invention, active control can be achieved by simply regulating the angles θ and ψ of the refueling hose such that the refueling hose pitch angle is maintained at the desired pitch angle and the yaw angle is maintained as the desired yaw angle.

It is noted that in some embodiments of the present invention, the control surfaces 600 may be configured to retract completely into the refueling drogue 100 or retract substantial distance into the refueling drogue 100 and/or otherwise fold around or collapse around the refueling drogue 100 or otherwise move towards the refueling drogue 100 so that, by way of example and not by limitation, the refueling drogue 100 can be more easily stowed. It is further noted that in some embodiments of the present invention, these surfaces 600 may be located at the connector 810 which may be a hose-drogue pivot point.

The active control system of some embodiments of the present invention may be utilized by implementing a control system having circuitry that utilizes a feedback system and/or iterative system and/or gain and/or error signals to generate control signals to actively control the position of the refueling drogue 100. For example, the difference in $\theta$-$\theta_{ref}$ and $\psi$-$\psi_{ref}$, may be treated as errors in such circuitry, where the reference angles are the desired angles of pitch and/or yaw. Still further, in some embodiments of the present invention, a logic routine may be utilized in the active control system computer 620 to control the control surfaces 600/610 and thus actively control the refueling drogue.

It is further noted that in some embodiments of the present invention, the power utilized to regulate the control surfaces 600/610 might be obtained by utilizing a self contained power source that, by way of example and not by way limitation, might be obtained by attaching a generator or other electrical producing device to the rotating mass 200 and/or the air turbine 300 to generate electric power and/or to charge a battery to power electrical actuators/servos of the control surfaces. Indeed, in other embodiments of the present invention, this electrical generator might be utilized to power the control system computer/circuits. Still further, in other embodiments of the present invention, batteries might be utilized to power the control surfaces. In yet further embodiments of the present invention, the combination of the two might be used. In other embodiments of the present invention, a hydraulic/pneumatic actuators might be used to move the control surfaces. In such an embodiment, a hydraulic pump might be attached to the mass 200 and/or the air turbine 300, where the rotation of the air turbine 300 and/or mass 200 rotates the pump, thus producing hydraulic power.

As noted above, some embodiments of the present invention can be practiced with a refueling drogue 100 that is free to pivot about the axis of the refueling hose 800. However, other embodiments of the present invention can be practiced where the refueling hose 800 is not free to pivot about the axis of the refueling hose 800 while still implementing an active control system.

Autonomous Docking

Some embodiments of the present invention may also include an autonomous docking system. In a first embodiment of the invention, some or all of the components of the just described active control system may be utilized to implement the autonomous docking system of the invention. In some embodiments of the invention, the drogue, which is operating in the active control mode, switches to the autonomous docking mode (although other embodiments can go from a non-active control mode to the autonomous docking mode.) In some embodiments, prior to switching to the autonomous docking mode, the location of the receiver aircraft is established via a second set of sensors that are located on the drogue 100. These sensors may continuously 'scan' for the receiver aircraft. Once its position has been established, the autonomous docking mode may be entered, the details of which will now be discussed.

The autonomous docking system of the present invention may enable the refueling drogue 100 to be "flown" (e.g., maneuvered under automatic control) to the refueling probe 2100 of a receiver aircraft 2000, which, in some embodiments of the invention, might be an unpiloted aerial vehicle. That is, in some embodiments of the invention, the autonomous docking system may be utilized to refuel an aircraft that does not maneuver to insert a refueling probe into the refueling drogue, but instead flies in a steady level fashion, which may be in formation with the refueling aircraft. Thus, the drogue 100 may be considered a smart drogue. In some embodiments of the invention, the receiver aircraft 2000 may be flying in relatively loose formation with the refueling aircraft 1000. In some embodiments of the invention, the refueling aircraft and/or the receiver aircraft may be a UAV or a UCAV. It is further noted that in some embodiments of the invention, the refueling aircraft may be unmanned as well, while in other embodiments, personnel on the refueling aircraft exert authority over the refueling operation (e.g., initiate the autonomous docking function, abort a docking procedure, etc.)

According to one embodiment of the invention, the autonomous docking system may be configured to vary the position of the refueling drogue 100 so that the centerline 105 of the refueling drogue along its longitudinal axis is coaxially aligned or substantially coaxially aligned with a centerline of the refueling probe 2100 of the receiver aircraft 2000 when the aircraft 2000 is not yet in contact with the refueling drogue 100. This may be accomplished, in some embodiments of the invention, in the manner discussed below.

Figure 16:
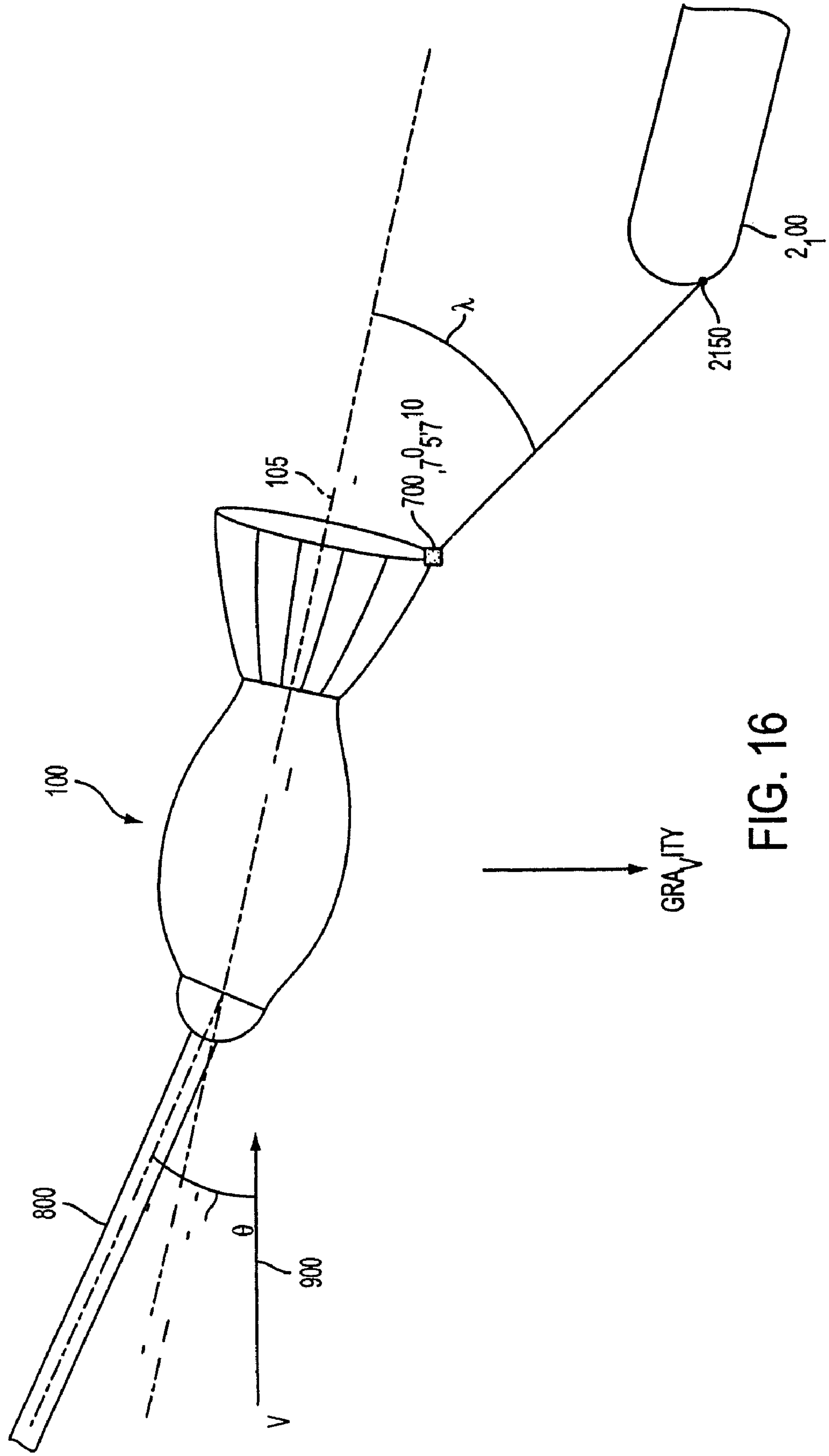
FIG. 16 shows the orientation of the axis of the drogue 100 with respect to a refueling probe as seen from one reference point.
Figure 17:
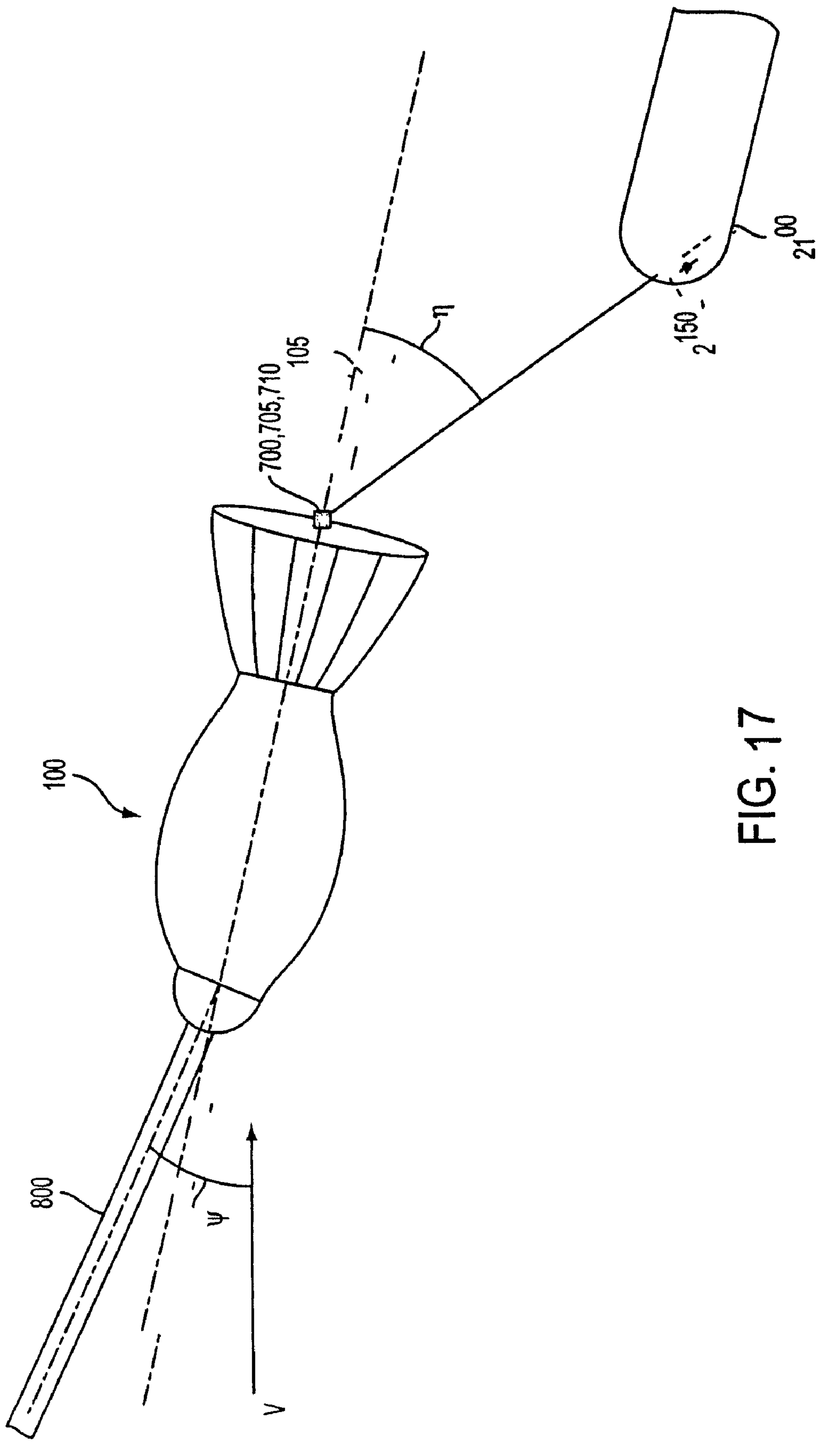
FIG. 17 shows the orientation of the axis of the drogue 100 with respect to a refueling probe as seen from another reference point.

The first embodiment of the invention, the autonomous docking system may be configured to measure angle or a plurality of angles between the refueling drogue 100 and the refueling probe 2100 of the receiver aircraft 2000 and/or, between a location on the refueling drogue 100 and a reference point 2150 (discussed in greater detail below) on the probe 2100. In the first embodiment of the invention, this angle (or angles) is (are) measured from a location at or near the receptacle of the refueling drogue 100 that receives the refueling probe 2100 to a location at or near the tip of the refueling probe 2100, and/or locations of known orientation from those locations, such as, for example, locations 700 and 2150 shown in FIGS. 16 and 17 (discussed in greater detail below) and, by using geometry, for example, converting these measured angles to angles that would be indicative of a measurement from the location at or near the receptacle of the refueling drogue 100 to a location at or near the tip of the refueling probe 2100. In some embodiments of the invention, the autonomous docking system may be configured to measure a plurality of angles between the refueling drogue 100 and the refueling probe 2100 of the receiver aircraft 2000. One of these angles may be an angle $\lambda$ measured in a plane (the first angle), which may be orthogonal to a control surface (e.g., the same plane as in FIG. 15), as shown in FIG. 16, which represents a side view of the drogue 100 and the probe 2100, and another angle $\eta$ may be an angle measured in another plane (the second angle), which may be orthogonal to the plane on which the first angle lies, as shown in FIG. 17, which represents a top view of the drogue 100 and the probe 2100. It is noted that in other embodiments of the invention, these angles may be measured in other planes that are orthogonal to one another, as well as in planes that are not orthogonal to one another.

Figure 12:
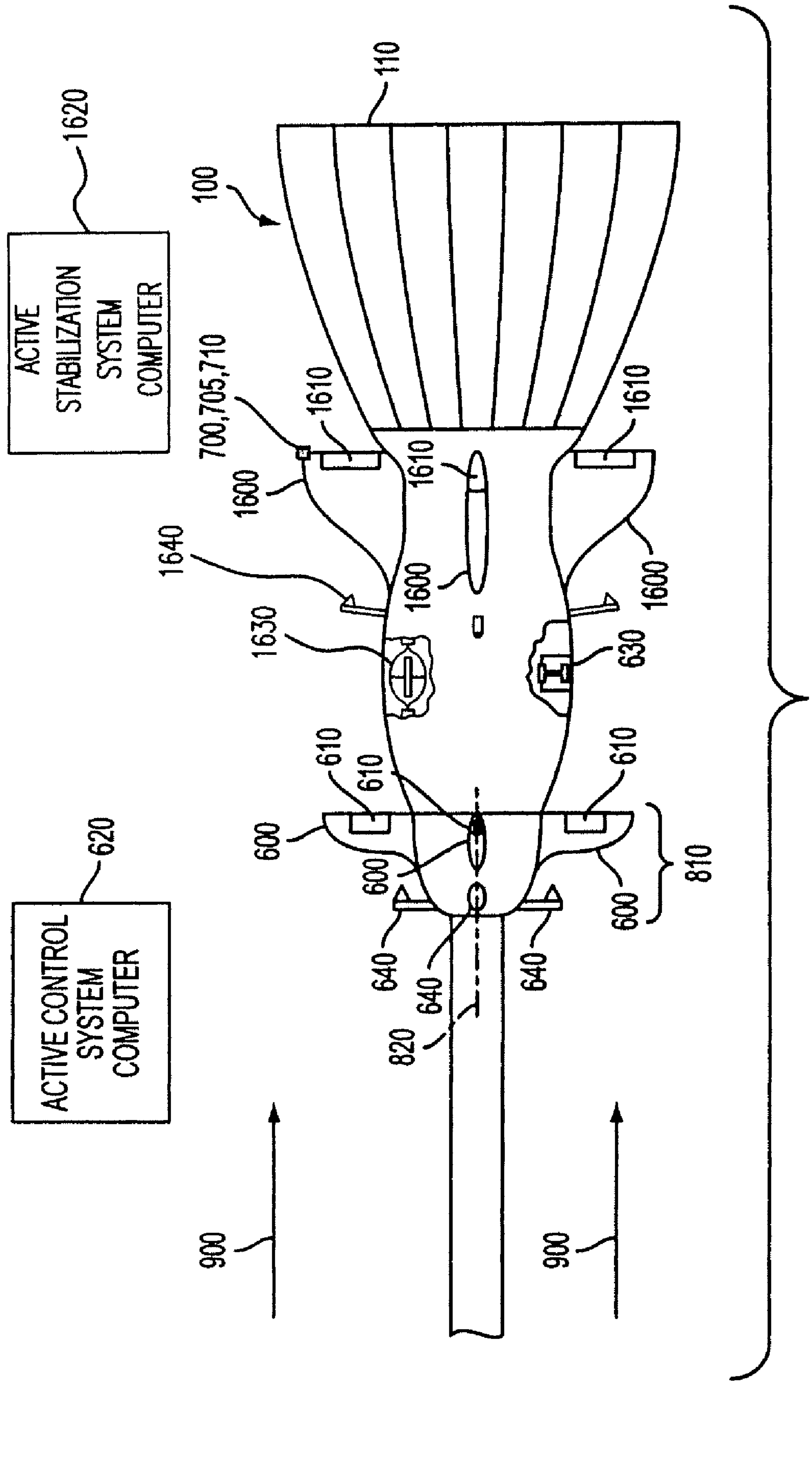
FIG. 12 shows yet another embodiment of the present invention.

It is noted that in some embodiments of the invention, the autonomous docking system may utilize the control surfaces 600/610 on the connector 810 to vary the position of the refueling drogue 100, while in other embodiments, the autonomous docking system may utilize the control surfaces 1600/1610 shown in FIG. 12, which may be located on the refueling drogue body, to practice the invention. Such control surfaces may be utilized to better regulate the location of the drogue 100 body in the case were the connection 810 includes a pivot component, although in other embodiments, the surfaces 600.610 may be used even if the connection 810 has a pivot component. In some embodiments, any control surfaces located anywhere may be used to practice the autonomous docking embodiment of the present invention, as long as the drogue 100 may be flown to the refueling probe 2100 of the receiver aircraft 2000.

In some embodiments of the present invention, the first angle and the second angle may be measured on planes orthogonal to the planes on which the control surfaces that regulate those angles lie. In yet other embodiments, angles may be measured in any plane that will allow the autonomous docking system to regulate the location of the refueling drogue 100 to achieve docking with the refueling probe 2100 may be used to practice the invention. Still further, angles may be measured from any location on the refueling drogue 100 and/or the refueling aircraft to any location on the refueling probe 2100 and/or the receiver aircraft 2000 that will permit autonomous docking to be performed.

Figure 18:
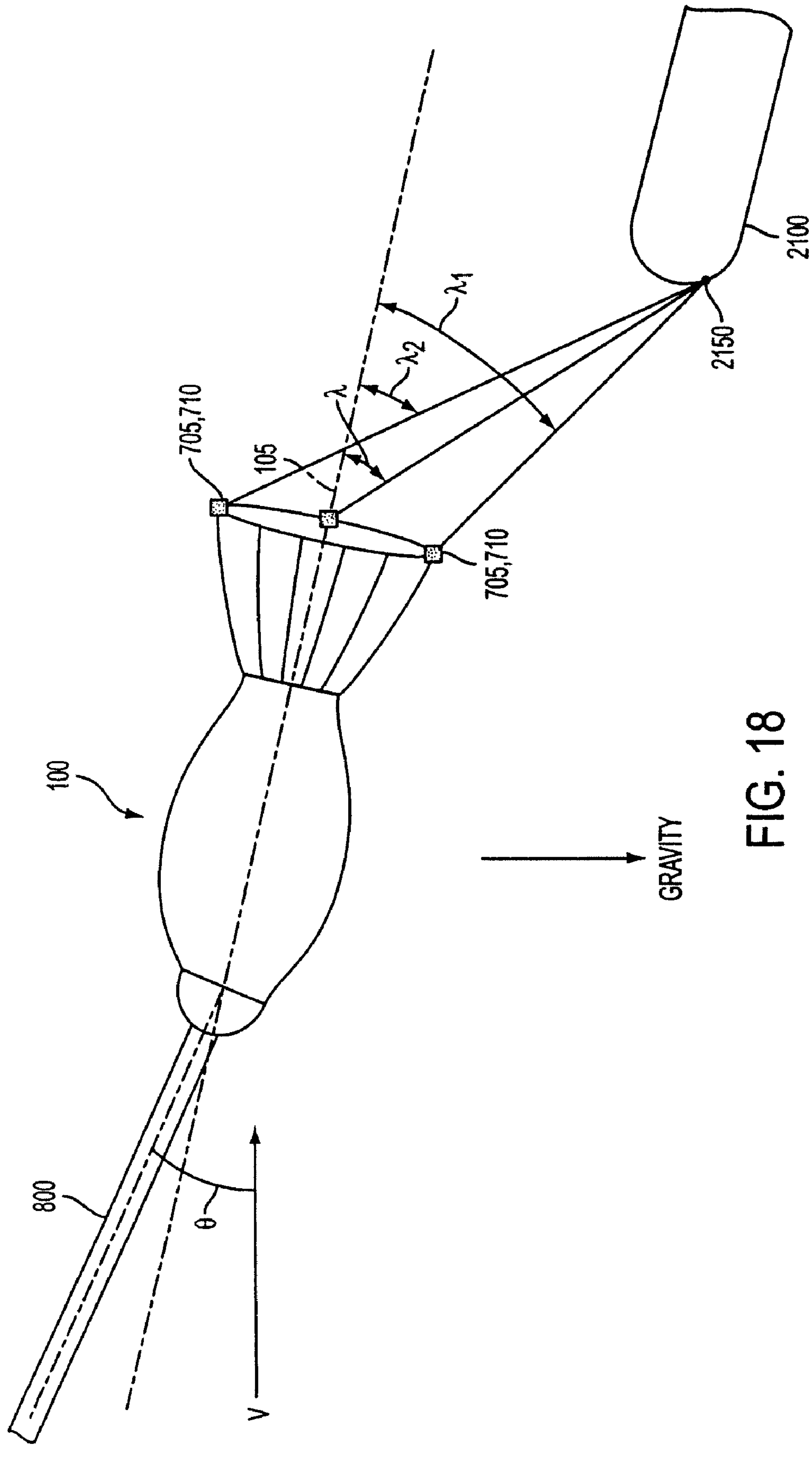
FIG. 18 shows the orientation of a plurality of sensors on the drogue 100 with respect to a refueling probe as seen from one reference point.
Figure 19:
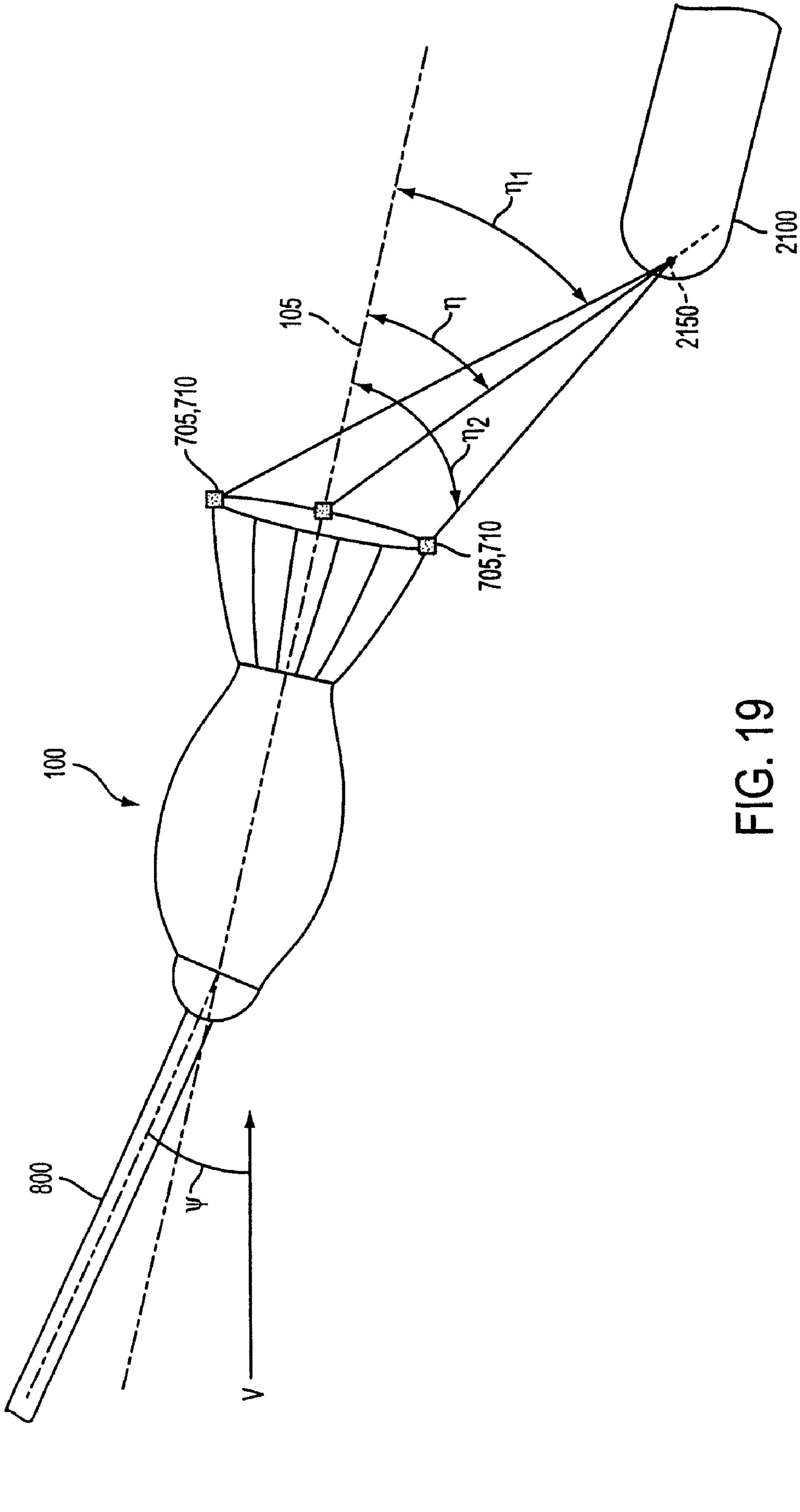
FIG. 19 shows the orientation of other sensors on the drogue 100 with respect to a refueling probe as seen from another reference point.

It is noted that in some embodiments, it may not be possible to locate a sensor along the drogue 100 axis 105 since this area may be needed to be kept clear to permit the probe to connect to the drogue 100. Thus, in one embodiment, the angle $\lambda$ can be measured using a pair of angle measuring sensors (as described above) located at diametrically opposite points on the drogue 100. These sensors may lie in the planes of the control surfaces. Each sensor may measure an angle $\lambda_1$ $\lambda_2$ respectively, as shown in FIG. 18. The true angle $\lambda$ may be obtained by averaging these two angles. A similar procedure may be used to measure $\eta$ by using a pair of sensors located diametrically opposite one another on the drogue 100. Each sensor may measure an angle $\eta_1$ and $\eta_2$ respectively, as shown in FIG. 19. The true angle $\eta$ may be obtained by averaging these two angles. Still further, it is noted that while the Figures show that the angles are being measured from a single reference point 2150, other embodiments could measure angles from multiple reference points. By way of example, a first angle might be measured to a first reference point 2150, and a second angle might be measured to a second reference point exactly 180 degrees on the other side of the probe 2100. Thus, in such an embodiment, the position of the drogue 100 might be changes so that these angles become, for example, substantially equal to each other. Still further, it is noted that other embodiments may be practiced with multiple sensors and/or multiple reference points.

In other embodiments of the present invention, the autonomous docking system may be configured to measure a relative displacement utilizing Cartesian coordinates. In yet other embodiments of the invention, any means that may be utilized to determine the relative locations of the refueling drogue 100 with respect to the refueling probe 2100 of a receiver aircraft 2000 may be utilized to practice the invention.

In the first embodiment of the invention, the autonomous docking system may be configured to regulate the location of the refueling drogue 100 with respect to the refueling probe 2100 of the aircraft 2000 so that the just mentioned first and second angles are reduced. In some embodiments, the first and second angles are reduced to about zero or zero. In other embodiments of the invention, the position of the drogue 100 is regulated so that the angles are such that they result in coaxial alignment of the probe and drogue based on the offsets of the points 700 and the point 2150 from the drogue 100 centerline. Thus, a control system may be utilized including a feedback system which may be an analogue system and/or a digital system, where the autonomous docking system determines that the refueling drogue 100 and the probe 2100 are aligned based on angle measurements of zero or substantially zero or other angle measurements. In some embodiments of the invention, circuitry that utilizes a feedback system and/or gain and/or error signals to generate control signals may be used to practice the invention. By way of example, the first and second angles may be converted to error signals, inputted into the circuit, and the circuit may output a control signal to the active control system so that the "error" will be reduced, thus reducing the first and second angles to substantially zero. (In some embodiments, a similar system/same system may be used to implement the active control system.) Thus, the autonomous docking system may be in communication with the automatic control system described above. Indeed, in some embodiments of the present invention, the automatic control system and the autonomous docking system may be embodied in one system.

According to one embodiment of the invention, once the centerline of the refueling drogue 100 is coaxial or substantially coaxial with the centerline of the refueling probe 2100, as discussed above, the refueling hose 800 connecting to the refueling drogue may be extended ("reeled out") from the refueling aircraft 1000 a distance until the refueling drogue 100 captures the refueling probe 2100 of the receiver aircraft 2000. It is further noted that the canopy and/or parachute 114 may provide additional resistance to the insertion of the probe 2100 into the receptacle of the refueling drogue 100. That is, the extra drag resulting from the canopy and/or parachute 114 may allow the drogue 100 to latch onto the probe 2100.

It will be noted that in some embodiments of the present invention, all of the components and/or some of the components making up the active control system may be used to practice autonomous docking. Recognizing that some embodiments of the invention implementing active control utilize an angle(s) based on the axis 820 of the refueling drogue 800 and or positions x, y, z of the of the drogue relative to the refueling aircraft to regulate the location of the refueling drogue 100 and/or determine the location of the refueling drogue 100, autonomous docking may utilize this angle(s) to implement autonomous docking as well. However, in other embodiments of the invention, autonomous docking may be performed without regard to the angle based on the axis 820 of the hose 800 and instead entirely be based on the angles between the drogue 100 and the probe 2100 (e.g. $\lambda$, $\eta$). In yet other embodiments of the invention, the combination of the angles may be used for autonomous docking. By way of example, logic may be utilized to shift location regulation of the drogue 100 from a location based on the angle of the axis 820 of the refueling hose 800 to location regulation based on angle(s) between the drogue 100 and the probe 2100 to practice autonomous docking.

In some embodiments of the present invention, the autonomous docking system utilizes a sensor that can locate a point on the refueling probe, and thus measure the angles $\eta$ and $\lambda$. In a first embodiment, the directional coordinates of radiation (which includes optical radiation) are used to determine the first and second angles. In a first embodiment, the drogue 100 includes a radiation emitter 705. The first embodiment of the invention, radiation (e.g., microwave and/or an optical beam) is emitted from the radiation emitter 705 and directed towards a radiation reflector on the refueling probe 2100 of the receiver aircraft 2000. The autonomous docking system may also include a radiation receiver 710 optionally mounted on the drogue 100, that receives radiation reflected from this radiation reflector (or, alternatively, receives radiation generated from the receiver aircraft 2000). The received radiation may be used to measure the angles discussed above. In some embodiments, the radiation receiver 710 may receive optical radiation from the probe 2100. Indeed, in some embodiments of the present invention, the drogue 100 need not have a radiation emitter 705. That is, some embodiments of the present invention may be practiced where the receiver aircraft emits the radiation detected by radiation receiver 710. In some such embodiments, the receiver 710 may be considered as homing in on the radiation emitted by the receiver aircraft, just as one may home in on a homing beacon.

It is also noted that in some embodiments of the invention, a device that emits radiation that varies about the device may be located on the receiver aircraft 2000, and in particular on the refueling probe 2100 of the aircraft 2000. The refueling drogue 100 may be configured with a device that will detect the variations in the radiation/field, and correlate those variations to an angular displacement between the probe 2100 and the drogue 100, thus enabling the autonomous docking system to align the axis of the drogue 100 with the axis of the refueling probe 2100 of the receiver aircraft 2000.

In the first embodiment of the present invention, the radiation could be an optical beam or a microwave beam. In the case of a microwave source, a simple transponder and/or a reflector, such as a corner reflector located on the probe, may be used that retransmits energy toward the source whenever it is energized by a microwave beam. The radiation receiver on the drogue 100 may be used to determine the relative angle or angles between the refueling drogue 100 and the refueling probe 2100. In some embodiments of the present invention, there may be a plurality of sensor configurations that could scan an area of about plus or minus 45 degrees from the centerline 105 of the drogue 100 in each of the two orthogonal directions.

The first embodiment of the invention may include a receiver that is adapted to receive an identification code from the receiver aircraft 2000. In some embodiments of the present invention, the identification code is not required for angle measurement. The first embodiment of the invention, the autonomous docking system may be configured to compare this identification code to a code stored in a database to determine the identity of the receiver aircraft 2000. In the first embodiment of the invention, this could be a simple transponder or corner reflector that retransmits energy to the source, wherein the retransmitted energy contains an identification code such that the signal is distinguishable. In some embodiments of the invention, the code may have information that can be utilized to determine the location and/or to adjust the offset of the basket.

It is noted that in some embodiments of the invention, when the centerlines of the refueling drogue 100 and the centerline of the refueling probe 2100 are substantially coaxial, the relative lateral positions of the drogue 100 and the probe 2100 may be controlled to, by way of example, about 6 inches and/or a few inches.

A number of sensor configurations may be used to transmit/receive radiation according to the present invention. For example, a narrow beam laser may transmits a beam to a mirror that may be rotated about a transverse axis thereby scanning a region. The reflected laser beam scans in the plane of incidence at an angle twice as large as the deflection angle of the mirror along the same optical path. (It is noted that sources other than a laser may be used.) The reflector structure that may be located on the refueling probe may be a simple mirror corner reflector. When illuminated by the source, the corner reflector may send a reflected signal back to the scanning mirror. An optical detector located at the source (near the scanning mirror) may generate a narrow electrical pulse when it receives this reflected signal. The angular position of the mirror at the instant this reflected pulse is received may yield a measurement at the relative angular position of the probe.

A relatively simple and inexpensive scanning microwave sensor can be implemented using a technique including locating a ferrite cylinder in the aperture of a section of rectangular waveguide. The ferrite material is magnetically biased via a simple electromagnet, and the relatively narrow microwave beam may be transmitted by the ferrite loaded waveguide (acting as an antenna). The angular deflection of this transmitted beam may vary proportionally (and maybe linearly) with the strength of the biasing magnetic field (i.e. the deflection may vary in proportion to the current through the electromagnet coil). The reflector in this case may either be a microwave corner reflector or a suitable transponder, either of which is located on the probe structure.

Active Stabilization

In another embodiment of the present invention, the refueling drogue 100 includes an active stabilization system. In contrast to the passive stabilization system discussed above, the active stabilization system utilizes, by way of example and not by way of limitation, control surfaces to impart or generate forces or moments onto the refueling drogue 100 to counter the forces or moments of turbulence, etc., on the refueling drogue 100. Thus, in the first embodiment of the invention, the refueling drogue 100 with the active stabilization system is adapted to effectively stabilize the refueling drogue when the refueling drogue 100 is placed in an air stream. In an exemplary embodiment as shown in FIG. 12, active stabilization may be achieved utilizing variable position stabilization surfaces 1610 located on surfaces 1600 on the refueling drogue. As the drogue passes through the air, the variable position stabilization surfaces 1610 on surfaces 1600 may be moved to counteract the effects of turbulence on the drogue 100 and thus stabilize the drogue. In the embodiment shown in FIG. 12, the stabilization surfaces 1600/1610 are located on the refueling drogue body. Alternatively, or in addition to this, the surfaces may be located on the hose near the hose/drogue connection. These surfaces may act to assist with passive stabilization and/or active stabilization of the drogue body. In the passive mode, these surfaces may provide aerodynamic stabilization similar to that provided to a conventional aircraft via horizontal and vertical stabilizer surfaces. In the active mode, movable surfaces (analogous to aircraft elevator and rudder surfaces) may provide stabilizing forces/moments when actively driven by a control system as described further below. As can be seen from FIG. 12, the stabilization surface 1600/1610 are located aft of the connector 810 that connects the drogue 100 to the refueling hose 800, and thus aft of the flexible joint 15 and/or other components that allow portions of the main body of the refueling drogue 100 (e.g., the portions aft of the connector 810) to pivot with respect to the hose in embodiments that have such features. It is noted that active stabilization may include (1) stabilization of the orientation of the drogue axis of symmetry (hereinafter denoted O.S.) and/or (2) stabilization of the translational motion of the drogue in a plane normal to the air velocity vector (hereinafter denoted T.S.).

Further in reference to FIG. 12, it can be seen that the stabilization surfaces 1600/1610 of this embodiment comprise two pairs of stabilization surfaces that are orthogonal to one another. In one embodiment, the surfaces lie in planes that intersect or substantially intersect the axis of symmetry of the refueling drogue. In some embodiments, the surfaces may be aerodynamically shaped and may be capable of being retracted for storage.

In yet other embodiments of the present invention, the stabilization surfaces need not be orthogonal. In some embodiments of the invention, the stabilization surfaces are located, when the drogue 100 is in the steady level flying condition and not rotating, in a vertical plane (i.e., plane lying parallel to the direction of gravity and parallel to the direction of the air stream 900 and in a horizontal plane, as judged from the horizon). However, in other embodiments of the present invention, the stabilization surfaces may be located in planes other than just mentioned. By way of example and not by way of limitation, the stabilization surfaces 1600/1610 may form a canted cross shape. Still further by way of example and not by limitation, the stabilization surfaces may form an X shape when viewed down the longitudinal axis of the refueling drogue 100. In other embodiments, three stabilization surfaces may be used. Such an embodiment might form a Y shape (with a "leg" and "arms" of the Y equal in length and spaced equally and/or where they are not equal in length and/or not spaced equally).

Some embodiments of the present invention utilize a stable reference device such as, by way of example and not by way of limitation, a gyroscope, to determine or otherwise identify a change in drogue orientation, and thus to identify the required orientation of the adjustable stabilization surfaces 1610. In most embodiments of the present invention, the stable reference device provides a short term stable reference. In some embodiments, it is a small instrument (for example, a solid state gyro), that obeys the usual laws of physics in that it keeps its orientation fixed in inertial space. By the term "short term," it is meant that the stable reference device is typically only relied on for a short period of time, around a few minutes, due to the drogues motion through the air and/or to imperfections in the operation of the device (e.g., gyro drift, etc.). However, the length of time that the device may be relied on can be shorter or longer depending on the various factors that affect the device (e.g., drogue movement, drift, etc.) In some embodiments, the short term stable reference may be slaved to a long term stable reference, for example, the gravity vector or the airstream direction. In such a manner, the instantaneous output from the short term stable reference may be used as a variation about the long term mean value of the stable reference. That is, the long term reference may be measured by an appropriate sensor and then averaged/low pass filtered with a time constant (for example, a time constant on the order of minutes).

The use of the long term and short term references to stabilize the drogue will now be described in an exemplary scenario. Suppose, for example, that a vertical gyroscope used as the short term reference had zero drift. On a long flight, say from Philadelphia to Sydney, Australia, the plane/drogue circles the planet, always with the belly of the plane/drogue pointing downward (along the direction of gravity). However, the gyroscope will not alter its orientation. Thus, at about Hawaii, the gyroscope will be 90 degrees from the true vertical direction, and at Sydney, it will be 180 degrees off from the true vertical direction (completely upside down with reference to the aircraft). By slaving the short term reference to a long term reference, such as the direction of gravity, the apparent problems with such an error may be eliminated.

Details of embodiments utilizing stable references will now be described.

In an embodiment of the invention utilizing active stabilization, the active stabilization system includes a stable reference device 1630, such as by way of example and not by way of limitation, a gyroscope; the stable reference device 1630 may be used to determine or otherwise detect that the orientation of the refueling drogue 100 has changed relative to a stable reference. The stable reference device 1630 may be mounted along the axis of drogue symmetry. The device 1630 may be mounted either mechanically (e.g., gimbaled) or analytically (e.g., strapdown). That is, the gyroscope (or equivalent spinning mass structure) may be supported in a gimbaled structure and/or may be configured in a so called strapdown gyroscope. In either case, the gyroscope, when coupled to appropriate instrumentation, yields an electrical measurement of the orientation of the refueling drogue relative to a fixed orientation. This fixed orientation may be, for example, the gravity vector or the air velocity vector. This may provide, for example, a long term orientation of a gyroscope to the local gravity vector. It is also noted that there may be more than one gyro. For example, there may be one gyro for localized pitch and one gyro for localized yaw. Still, other embodiments may use other arrangements.

In an embodiment of the actively stabilized drogue, the stable reference may be obtained by spinning and/or activating a gyroscope that is mounted within the refueling drogue 100 such that the orientation of the refueling drogue 100 may change about the gyroscope. That is, due to the gyroscopic effect that tends to effectively stabilize the gyroscope, a change of orientation of the refueling drogue 100 will not effectively change or otherwise impact the orientation of the gyroscope. In this regard, the stable reference device may include sensors that detect/determine drogue body movement about the gyroscope. The stable reference device thus dictates a stable reference that may be used to determine a change of orientation of the drogue. This change may be determined, for example, by utilizing the just mentioned sensors to determine the change in orientation of the drogue relative to the gyroscope whose orientation has effectively not changed.

In the embodiments that utilize a gyro, the gyros may indicate pitch angle (gimbaled vertical gyro) and/or indicate yaw angle (gimbaled directional gyro). The gimbaled vertical gyro may be torqued (or erected) to represent instantaneous pitch oscillations about the long term average (mean) value of the long term reference, which, in some embodiments, may be a gravity sensor. Corollary to this is that the instantaneous output of a strapdown gyro may be analytically (mathematically) referenced to the long term reference (which again may be the direction of gravity). The gimbaled directional gyro may be aligned with a long term reference, such as the direction of the airstream velocity vector. Alternatively or in addition to this, other references may be used. For example, an optical system and/or a radar system could be used in conjunction with the refueling aircraft for a long term reference. A strapdown directional gyro may be analytically aligned with the airstream velocity direction. In both the case of the directional gyro and the vertical gyro, the gyro provides instantaneous (short term) deviation in drogue angle.

Because the refueling drogue 100 has a long term stable reference from which a change in the orientation of the refueling drogue 100 may be identified, the refueling drogue can utilize this long term stable reference in conjunction with the short term stable reference in a system to actively stabilize the refueling drogue 100. A control system (e.g., 1620) receives inputs from sensors that measure drogue orientation and generate control signals to actuators on control surfaces 610 and/or 1610. These control signals operate in a way that regulates control surfaces such that the angular motion of the drogue is minimized. Furthermore, the mean (time averaged) orientation conforms to the desired value which might be, by way of example, in a vertical plane through the velocity vector and at a fixed angle with respect to a horizontal plane. In some embodiments utilizing strapdown gyros, it may be necessary to have multiple gyros and accelerometers (three each, for example). Conversely, in some embodiments, it may only be necessary to implement the present invention to stabilize for vertical oscillations (i.e., pitch) and/or only for lateral (yaw) motion.

In one embodiment, the active stabilization system is adapted to control the variable position stabilization surfaces 1610 based on the orientation of the drogue relative to the stable reference dictated by the stable reference device 1630. In an exemplary embodiment of the actively stabilized refueling drogue, the active stabilization system is adapted to control the variable position stabilization surfaces 1610 to effectively eliminate the change in the orientation of the refueling drogue relative to the stable reference based on a determined change. In this regard, the present invention includes a logic device/electronic control system, such as by way of example and not by way of limitation, an active stabilization system computer 1620 which can determine a change in the orientation of the refueling drogue relative to the stable reference. The logic device/electronic control system may output a control command to activate the variable position stabilization surfaces 1610 such that this change in orientation relative to the stable reference will effectively be eliminated. By way of example and not by way of limitation, any change in orientation from the stable reference may be considered an error by the logic system/computer and, therefore, the variable position stabilization surface 1610 may be controlled to reduce and/or eliminate this error.

In another embodiment of the invention, the logic device/electronic control system is further adapted to determine a difference in the orientation of the refueling drogue relative to the stable reference, and the active stabilization system is adapted to control the variable position stabilization surfaces to reduce the difference in the orientation of the refueling drogue relative to the stable reference based on this determined difference. By way of example and not by way of limitation, the logic device may calculate an angle representing a change in orientation of the refueling drogue about an axis of the stable reference. A reference might be, for example, the local air velocity vector or gravity vector. Lateral translation of the drogue (along coordinates normal to the velocity vector) may be estimated by measurement of the angle of the hose axis relative to one or both of these vector. The control surfaces may regulate drogue lateral positions by controlling these two angles via actuators and control surfaces (610 and/or 1610 of FIG. 12). The logic device may then calculate the necessary displacement of the variable position stabilization surfaces 1610 that would result in the reduction and/or effective elimination of this difference in angular orientation. In other embodiments of the present invention, a lookup table may be used in lieu of and/or in addition to calculation. That is, for example, the active control system may utilize a signal representing a change in the orientation of the drogue relative to the stable reference, for example, a voltage value and then, utilizing information contained in the signal (e.g., the voltage value), go to the lookup table and identify the "amount" of orientation change that this signal represents. Alternatively, the lookup table could simply contain the required displacement of the variable position stabilization surface 1610 that would be needed to and/or effectively eliminate this change in orientation. In other embodiments of the present invention, any device or method that may be utilized to reduce and/or effectively eliminate the change in orientation about the stable reference may be used to practice the invention. It is noted here that the system described above can operate to maintain a substantially fixed drogue position and orientation relative to the fixed reference, thus achieving both O.S. and T.S.

It is noted that in some embodiments of the present invention, the active stabilization system may be configured to actively stabilize (O.S.) the refueling drogue 100 for substantially any rotation angle of the refueling drogue about its symmetry axis, and thus the stabilization surfaces. As with the active control system discussed above, some embodiments may utilize the sensor 630 to measure the rotation angle $\gamma$ of the refueling drogue with respect to a fixed direction (such as the direction of gravity), and thus the rotation angle $\gamma$ of the control surfaces 600 with respect to the fixed direction. However, other embodiments of the active stabilization system may not need to utilize the sensor 630. By way of example, in systems utilizing a stable reference device that may still provide a stable reference when the drogue body and/or the stable reference device is completely inverted, the drogue may be stabilized without the need to determine or otherwise identify a rotation angle.

In many respects, an active stabilization system according to the present invention may be practiced by utilizing components that are similar to and/or the same as components that may be found in an autopilot system on an aircraft. (Although it is noted that in an autopilot system, autopilot controls are based on a plane of symmetry, and thus some embodiments of the present invention utilizing autopilot components/systems account for the fact that some embodiments of the present invention include refueling drogues that have an axis of symmetry as opposed to a plane of symmetry.) That is, the active stabilization system may include sensors that measure drogue axis orientation relative to a reference frame, generate control signals responsive to said measurements and indicative of errors in the measured orientation relative to a desired orientation, and supply said control signals to control surface actuators such that these errors are reduced to substantially zero via the drogue dynamic response resulting from control surface deflection. Still further, components and systems similar to or the same as a fly-by wire system utilized on aircraft may be utilized to achieve active stabilization according to some embodiments of the present invention. Thus, some embodiments of the present invention may utilize any device and/or method which can be implemented to identify an actively stabilized refueling drogue as would be utilized to actively stabilize an aircraft. It is further noted in embodiments utilizing fly-by wire componentry and/or autopilot componentry, stabilization of the drogue may be achieved independently of its orientation with respect to the horizon. Thus, active stabilization systems according to the present invention may be different from fly-by wire systems and autopilot systems in this regard. Other sensor systems for measuring the relative position of the drogue may be used in the present invention. For example an optical system may be located on the refueling aircraft (e.g., in or near a stowage pod) that measures the relative drogue/refueling aircraft position. This optical system can, for example, include the optical source and receiver system on the drogue itself with a cooperative reflector (e.g., corner reflector) on the refueling aircraft. The control system described above can operate control surfaces to maintain a fixed desired relative drogue/aircraft position orientation.

In other embodiments, airstream and/or gravity sensors alone as short term references without gyros are used to obtain active stabilization. Such an embodiment might be implemented in conjunction with computer controls to cancel/account for the elevated "noise" (in comparison to a gyro) in such systems.

In some embodiments of the present invention, the long term reference could be the gyroscopes on the refueling aircraft and/or other navigation devices/instruments. Alternatively or in addition to this, the long term reference could be a location on the refueling aircraft itself. Communication between the refueling aircraft and the drogue could be achieved via wire, optical, radio transmission, etc, so that the refueling drogue can obtain the information needed to compare the long term reference to the short term reference.

Other embodiments of the present invention may utilize a change in the orientation of the drogue relative to the hose 820 and/or the hose-drogue connector 810 to determine the required positions of the adjustable control surfaces 1610 to actively stabilize the drogue body. Such embodiments may not include a gyro. By way of example, drogues utilizing an active control system, such as described above, may have controlled angles between the axis of the refueling hose 800 with respect to a reference axis. To this end, some embodiments of the present invention utilize an angle of the refueling drogue body (i.e. the portions of the refueling drogue aft of the hose/connector) with reference to the refueling hose to obtain information to determine how to stabilize the refueling drogue. An embodiment of the present invention that utilizes the active stabilization system may be configured to regulate the orientation of the refueling drogue body based on measured angles between a reference on the hose/line/connector (which may be, by way of example and not by way of limitation, the axis 820 through the center of the refueling hose/line 800) and/or the direction of air flow V, and a reference on the refueling drogue body (which may be, by way of example and not by limitation, the centerline 105 of the refueling drogue body). This reference axis may be based on, for example, the direction of gravity and/or the direction of air flow V of the air stream 900. In other embodiments, this reference axis may be based on the stabilization surfaces 1600/1610 of the refueling drogue. However, in other embodiments, the axis may be based on any fixed component of the drogue body, as long as there is some way to determine the orientation of the drogue body with respect to the refueling hose/connector and/or the air stream velocity V.

Figure 22:
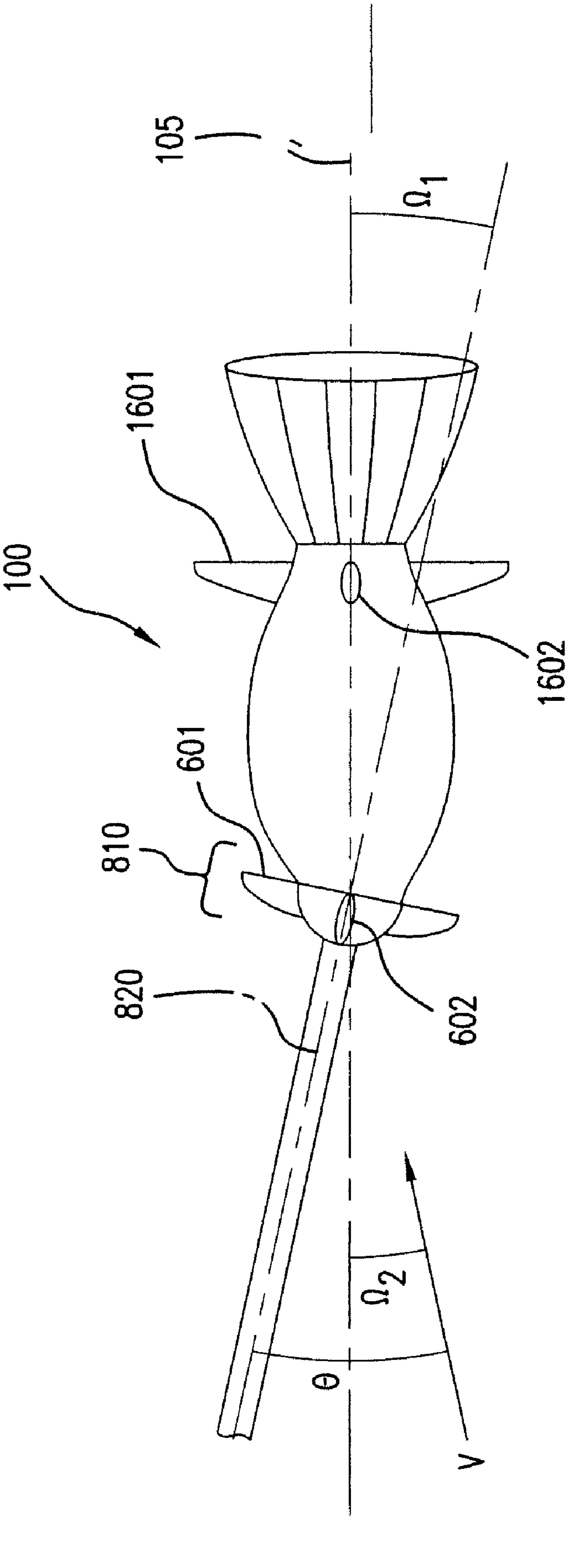
FIG. 22 shows the orientation of an axis of the drogue body with respect to an axis of the refueling drogue hose and the velocity vector of the airstream.
Figure 23:
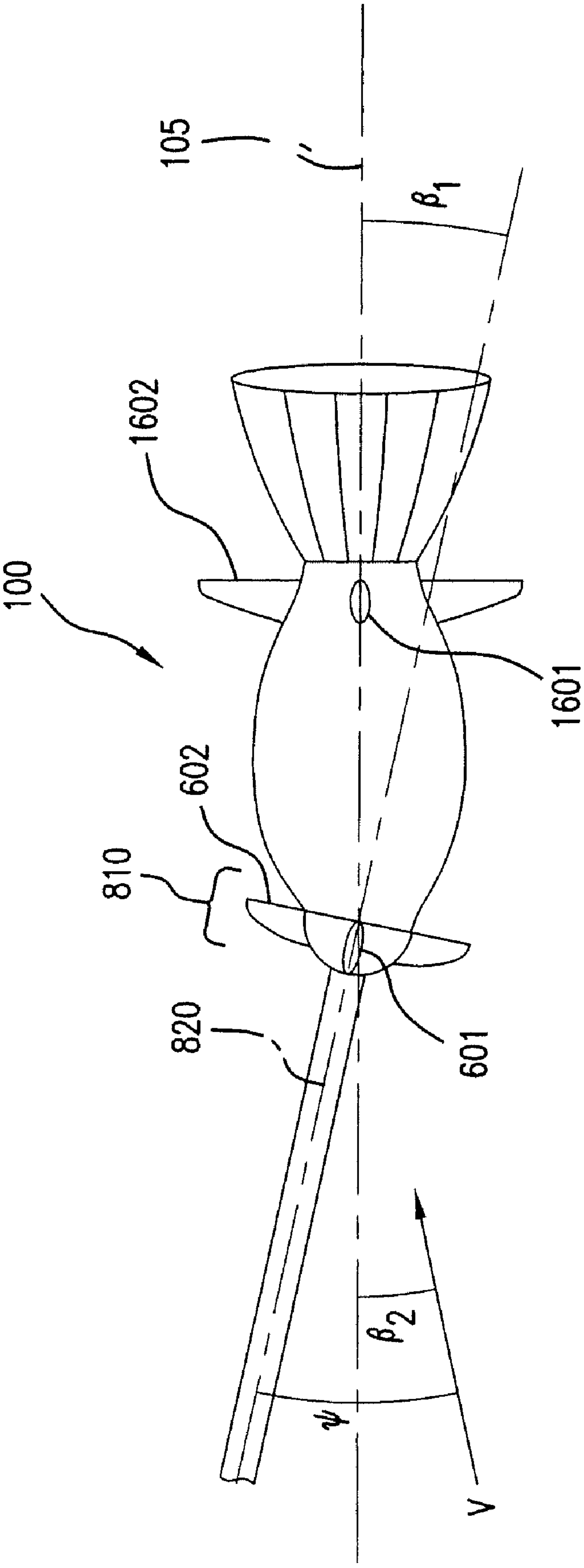
FIG. 23 shows the orientation of an axis of the drogue body with respect to an axis of the refueling drogue hose and the velocity vector of the airstream as seen from another reference point.

In an exemplary embodiment of the actively stabilized drogue according to the present invention, two angles are measured in planes orthogonal to one another, the angles being measured in reference to stabilization surfaces 1600. The first angle, $\Omega_1$, represents the angle between the axis 820 of the refueling hose and axis 105 of the refueling drogue body in a plane of a stabilization surface, which, in FIG. 15, is control surface 1601, while the second angle, $\beta_1$, represents the angle between the axis 820 of the refueling hose and the axis 105 of the refueling drogue body in a plane of a second stabilization surface, which, in FIG. 15, is control surface 1602. This can be seen in FIGS. 22 and 23, FIG. 22 showing the angle $\Omega_1$ of the refueling hose 800 relative to the axis 105, while FIG. 23 shows the angle, $\beta_1$, of the refueling hose 800 relative to the axis 105. However, it is noted that other embodiments of the present invention may measure angles that are not orthogonal to one another and/or not in the just mentioned planes and/or not in the planes of the control surfaces. It is further noted that in some embodiments of the present invention, the refueling hose 800 may rotate with the refueling drogue body and/or independently of the refueling drogue body. By utilizing a rotation sensor, such as that described above, the rotation angle $\gamma$ of the refueling hose 800 at section 810 may be determined relative to the reference axis, as exemplary depicted in FIG. 15 and thus the angles $\Omega_1$ and/or $\beta_1$ may be correlated to the hose 800.

An alternative method and apparatus for determining the orientation of the drogue body relative to the hose will now be described. In this alternative method apparatus, instead of directly determining the angles between the hose and the drogue body, angles of the hose relative to the direction of air flow V and angles of the drogue body relative to the direction of air flow V are determined, and then these angles are correlated to determine the angles relative to the hose and the drogue body. This may be accomplished as follows.

Two angles are measured in planes orthogonal to one another, the angles being measured in reference to control surfaces 1600. The first angle, $\Omega_2$, represents the angle between the direction of air flow V and axis 105 of the refueling drogue body, which, in FIG. 15, is control surface 1601, while the second angle, $\beta_2$, represents the angle between the direction of air flow and the axis 105 of the refueling drogue body in the plane of a stabilization surface, which, in FIG. 15, is control surface 1602. This may be seen in FIGS. 22 and 23; FIG. 22 showing the angle $\Omega_2$ of the direction of air flow V relative to the axis 105; FIG. 23 showing the angle, $\beta_2$, of the direction of air flow V relative to the axis 105. However, it is noted that other embodiments of the present invention may measure angles that are not orthogonal to one another and/or not in the just mentioned planes and/or not in the planes of the stabilization surfaces.

If the angles $\theta$ and $\psi$ are known, as may be determined above, $\Omega_2$ and $\beta_2$ may be added/subtracted electronically to/from these angles, as applicable, to determine the angles between the hose and the drogue body. As can be seen, this embodiment is most directly practiced when angles $\theta$ and $\psi$ and $\Omega_2$ and $\beta_2$ are measured in the same respective planes. However, as will be appreciated, when these angles are measured in different respective planes, the angles between the drogue body and the hose may be determined by converting one reference into the other utilizing basic geometry, providing that one reference may be correlated to the other, which may be achieved if the angle between the two reference systems is known or can be determined, such as described above. It is noted that a control system may be configured to perform the above addition/subtraction.

In yet other embodiments of the present invention, it may be sufficient to simply determine the angles between the refueling drogue body and the direction of air flow V irrespective of the refueling hose. That is, all that may be necessary is to determine the orientation of the refueling drogue body relative to the direction of air flow V to actively stabilize the drogue. (In such embodiments, $\Omega_2$ and $\beta_2$ alone may be used to actively stabilize the refueling drogue.)

The angles $\Omega_{(1,2)}$ and $\beta_{(1,2)}$ may be measured on any two respective planes, providing that there is a way to link the orientation of the planes to the orientation of the stabilization surfaces of the refueling drogue 100 so that the active stabilization system may adjust the variable position stabilization surfaces 1610 to regulate the orientation of the drogue body. Again, it is noted that in some embodiments of the present invention, the angles $\Omega_{(1,2)}$ and $\beta_{(1,2)}$ may be measured on planes orthogonal to the planes on which the stabilization surfaces that regulate those angles lie. In some embodiments, this may permit the orientation of the drogue 100 to be regulated without reference to the horizontal plane and/or the vertical plane. In yet other embodiments, angles measured in any plane that will allow the active stabilization system to regulate the orientation of the refueling drogue 100 may be used to practice the invention.

By utilizing a rotation sensor, such as that described above, the rotation angle $\gamma$ of the refueling hose 800 at section 810 may be determined relative to a reference axis, as exemplary depicted in FIG. 15. Still further, by determining this rotation angle the measured angles $\Omega_{(1,2)}$ and $\beta_{(1,2)}$ may be converted to a refueling drogue body pitch angle $\Omega_{(1,2)}'$ and a refueling drogue body angle $\beta_{(1,2)}'$, via standard coordinate transformation, as can be readily seen from FIG. 15. Thus, the drogue body may be actively stabilized by regulating the pitch and yaw angles based upon measurements of angles $\Omega_{(1,2)}$ and $\beta_{(1,2)}$. Again, it is noted that while the embodiment depicted in FIG. 15 shows the angles and the stabilization surfaces in orthogonal relationship to one another, other embodiments may be practiced where they are not in orthogonal relationship to one another.

In a first embodiment of the present invention, the stabilization system is configured to substantially maintain $\Omega_1$, and/or $\Omega_2$ and/or $\beta_1$ and/or $\beta_2$ at respective constant reference angles, and thus the stabilization system may be configured to substantially maintain the orientation of the refueling drogue body at respective constant reference angles. That is, a desired pitch and/or a yaw of the refueling drogue body may be achieved. In some embodiments of the present invention, the reference angle for the angle $\beta_{(1,2)}'$ of the drogue body is a value such that the drogue axis 105 is zero degrees or substantially zero degrees from the vertical plane, and thus has a yaw angle of zero, although it could be other angles as well. In contrast, an embodiment of the present invention may utilize a pitch angle that results in a drogue body axis orientation that is a non-zero angle from a reference plane corresponding to the horizontal plane, as well as a zero degree angle or substantially zero degree angle from the reference plane. That is, the axis 105 of the refueling drogue body, in some embodiments of the present invention, may have a pitch angle that results in a non-zero angle relative to the horizontal plane due to the effects of gravity and/or the aerodynamic forces on the refueling drogue at steady level flight and/or the bow wave effect from the receiver aircraft. Still further, in some embodiments of the present invention, the pitch angle maintained by the stabilization system may be purposely variable from the angle that would normally result from aerodynamic forces and/or the effects of gravity.

According to a first embodiment of the present invention, as noted above, active stabilization of the refueling drogue body to maintain a given orientation may be achieved by controlling angles of the axis of the refueling drogue body with respect to a reference axis. Such a reference axis, as noted above, might be determined based on the direction of the air stream 900. Thus, some embodiments of the present invention may be practiced with sensors 1640 that are configured to measure an angle between the axis 105 of the refueling drogue body and a direction of an air stream 900 flowing past the refueling drogue, thus measuring the angles $\Omega_2$ and $\beta_2$. In the first embodiment of the present invention, the sensors 1640 may be angle of attack/side slip sensors as described above. In the first embodiment of the invention, these sensor 1640 are positioned to measure $\Omega_2$ and $\beta_2$. These sensors may be positioned anywhere that will permit the angles $\Omega_2$ and $\beta_2$ to be measured. It is noted that in some embodiments, the connector 810 is rigidly mounted to the refueling hose 800, and thus may be part of the refueling hose 800 and/or part of the body of the drogue 100. Therefore, in some embodiments, the sensor 640 for active control may be used.

In an exemplary embodiment, these sensors comprise a rotary vane and shaft that pivots, as with the sensors described above for the active control system. The vanes extend into the air stream 900 and are aligned, during operation, by aerodynamic forces to lie parallel to the air speed velocity vector. The shaft of the vanes is connected to an angle sensor such as, by way of example, a rotary potentiometer. In some embodiments of the invention, the sensors 1640 may output an analog and/or digital electrical signal that may be used to determine angular deviation from a desired $\Omega_2$ and $\beta_2$ angle. In the first embodiment of the invention, the sensors 1640, or more specifically the vanes of the sensor 1640, are located such that they are substantially orthogonal to one another. Thus, in the first embodiment, of the present invention, the active stabilization system computer 1620 is configured to receive signals from the sensors 1640 and analyze these signals and determine what corrective control signals should be outputted to actuators of the stabilization surfaces 1600/1610 to return the refueling drogue body to the desired orientation.

It is noted that in other embodiments of the present invention, an inertial measurement unit might be utilized to provide the necessary data to stabilize the refueling drogue.

The active stabilization system of some embodiments of the present invention may be utilized by implementing a stabilization system having circuitry that utilizes a feedback system and/or iterative system and/or gain and/or error signals to generate stabilization signals to actively stabilize the drogue body. For example, a difference in $\Omega_{(1,2)}-\Omega_{(1,2)\ ref}$ and $\beta_{(1,2)}-\beta_{(1,2)\ ref}$, may be treated as errors in such circuitry, where the reference angles are the desired angles that result in the desired of pitch and/or yaw angles. (In an exemplary embodiment, $\Omega_{2\ ref}$ and $\beta_{2\ ref}$ would be zero degrees to obtain a zero pitch angle and a zero yaw angle of the refueling drogue body, $\Omega_{1\ ref}$ and $\beta_{1\ ref}$ might be zero or non-zero depending on the angle of the hose axis 820 relative to V.) Still further, in some embodiments of the present invention, a logic routine may be utilized in the active control system computer 1620 to control the stabilization surfaces 1600/1610 and thus actively stabilize the refueling drogue.

It is further noted that some embodiments of the present invention may utilize the power sources as described above to power the active stabilization system.

Some embodiments of the active stabilization system may be practiced with a refueling drogue 100 that is free to pivot about the axis of the refueling hose 800. However, other embodiments of the present invention may be practiced where the refueling hose 800 is not free to pivot about the axis of the refueling hose 800 while still implementing an active stabilization system. In these latter embodiments, it may only be necessary to determine $\Omega_2$ and $\beta_2$ to stabilize the refueling drogue body.

It is noted that when referring to "logic" herein, "logic" refers to methods and/or devices and/or algorithms, as applicable, to execute logic routines. In regard to logic devices, such devices can encompass processors, which in turn can encompasses both simple circuits and complex circuits, as well as computer processors.

Figure 10:
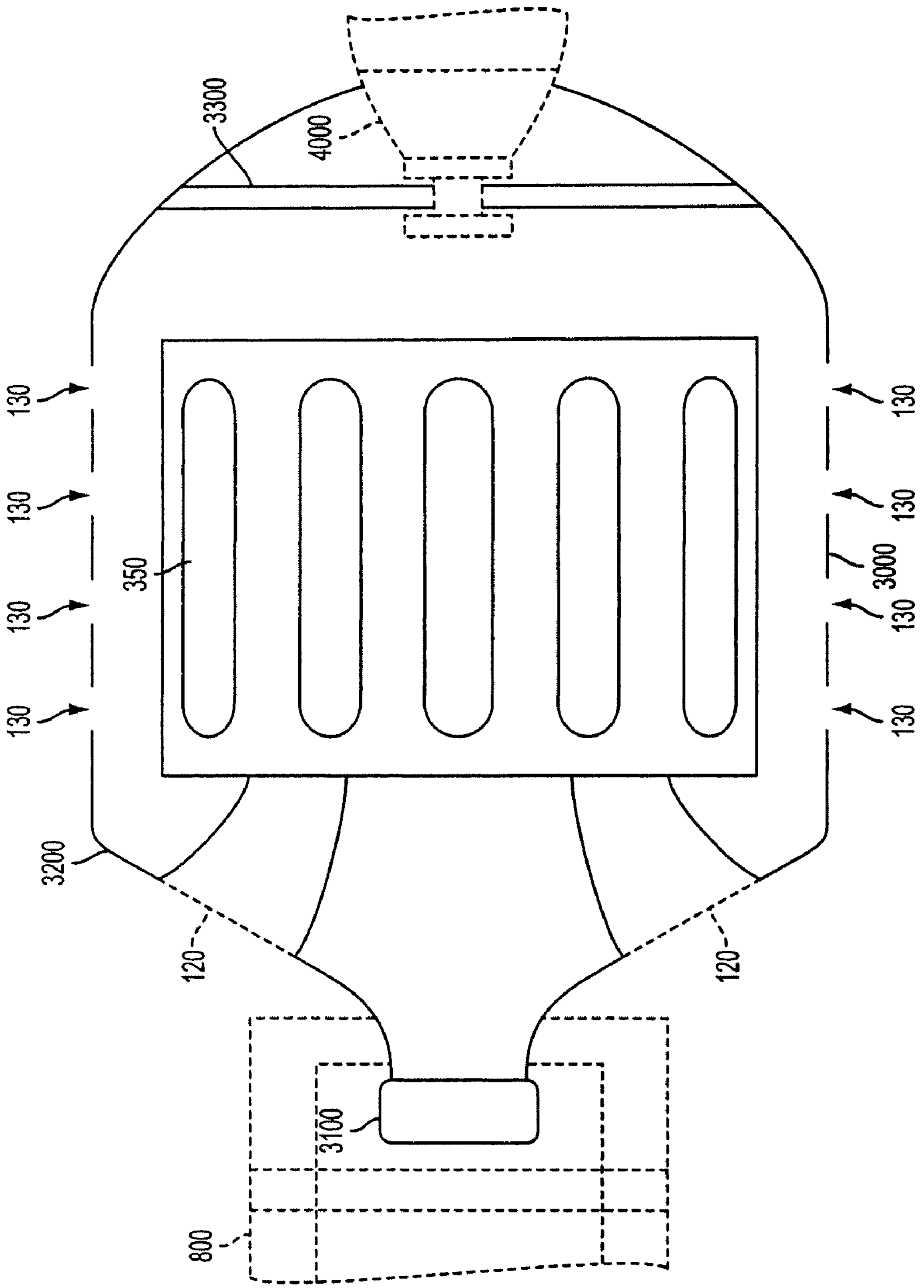
FIG. 10 shows yet another embodiment of the present invention.

While the above embodiments have been described in terms of a refueling drogue 100 with the rotating mass 200 and the air turbine 300, other embodiments may be practiced. By way of example and not by limitation, an embodiment of the present invention may include a stabilization kit that includes a spin stabilization pack 3000, as shown in FIG. 10, that is configured to attach to a refueling drogue 4000 and/or a refueling hose 800 that may "retrofit" an existing refueling drogue, such as by way of example and not by way of limitation, an MA-3 Drogue, to be passively stabilized according to the present invention. The stabilization pack 3000 might include the same or similar attachment device 3100 that is used to attach a standard refueling drogue to a refueling hose 800. In some embodiments, the pack 3000 might include a flexible joint, which may be located between attachment device 3100 and the rotating mass, allowing the rear portions of the pack (including the rotating mass) to pivot, and thus allowing the drogue to pivot, while in other embodiments the pack might not include a joint. In some embodiments practiced on a drogue that has a pivot joint, the drogue may be adapted so that the drogue will not pivot about that point, such as, by way of example, inserting a strap in a cavity around the joint, creating interference contact with the pivoting components, etc. Some embodiments of the pack 3000 may be practiced with any device that will permit the pack to be attached to a refueling hose 800 of an aircraft.

Figure 21:
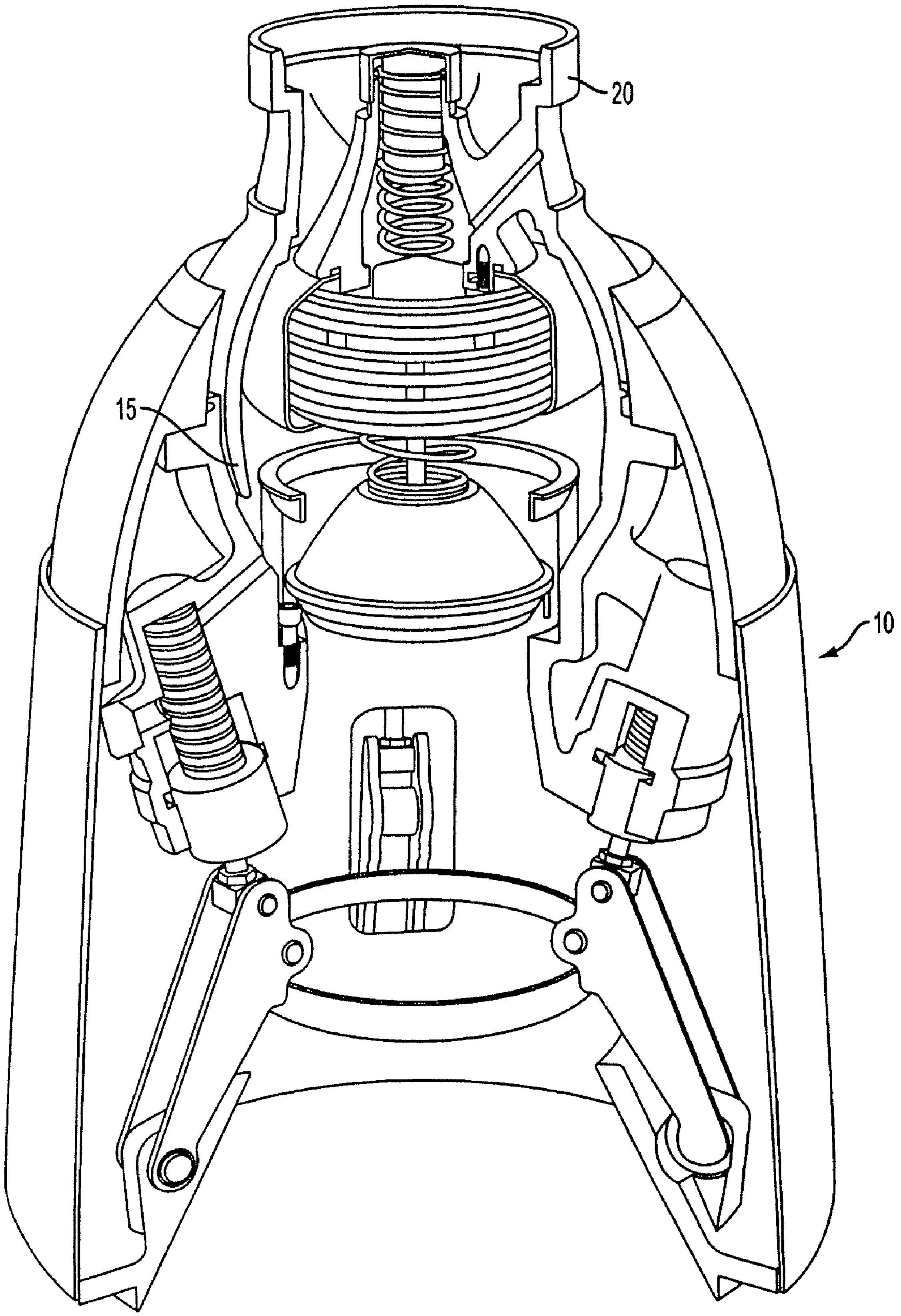
FIG. 21 shows an exemplary embodiment of a conventional refueling drogue.

An exemplary embodiment of a conventional refueling drogue 10 can be seen in FIG. 21. Here, a flexible joint 15 permits the body of the drogue 10 to pivot. In some embodiments of the invention, this flexible joint may be replaced with a non-flexible joint. A pack 3000 may then be attached to component 20, thus causing the rotating mass of the pack 3000 to be rigidly connected to the body of the refueling drogue 10. As the pack 3000 may have a flexible joint between the hose attachment location of the pack 3000 and the rotating mass of the pack, which may be similar to and/or the same as the flexible joint 15 shown in FIG. 21, the retrofitted drogue may be allowed to thus pivot with respect to the hose 800. This flexible joint can be used in the refueling drogue 100 as well.

The pack 3000 may include a body 3200 enclosing the air turbine 350 (radial turbine), having air inlet ports 120 and outlet ports 130. In a first embodiment, the air turbine 350 may also serve as the rotating mass.

Some embodiments of the present invention may have a brake that can stop and/or slow the rotation of the rotating mass 200 and/or the air turbine 300. Some embodiments may utilize a friction brake, while other embodiments may utilize a device to stop the flow of air past the air turbine, thus allowing the mass and/or air turbine to slow and eventually stop or at least rotate at a lower nominal value.

The pack 3000 may also include a refueling drogue attachment fitting 3300 that is configured to receive a typical conventional refueling drogue 4000. In a first embodiment of the present invention, the pack 3000 is configured to be rigidly attached to the refueling drogue 4000. In still further embodiments of the present invention, the pack 3000 is configured to attach to the refueling drogue 4000 in the same manner or in a similar manner as a conventional refueling hose 800 is currently attached to a conventional refueling drogue 4000. It is noted that the pack 3000 may be configured to also permit aviation fuel to travel through and/or around the pack 3000.

Still further, other embodiments of the present invention include kits that comprise devices that will enable conventional refueling drogue to be retrofitted to be actively controlled and/or to perform an autonomous docking mission according to the present invention. Such devices might be of similar kind to the pack 3000, except that the pack has features such as control surfaces, sensors, etc., necessary to implement active control and/or autonomous docking. In some embodiments of the present invention, a pack may have the passive stabilization system and/or the active control system and/or the autonomous docking system in one pack, or at least the components that physically interface with the air stream (e.g., the vanes, the control surfaces, etc.) required to implement those systems (the other components may be added directly to the refueling aircraft as long as there is a means to interface with the retrofit packs). Thus, any kit/pack that contains any or all of the above elements of the active control and/or autonomous docking and/or passive stabilization embodiments and/or will permit the implementation of the functions of active control, and/or autonomous docking and/or passive stabilization, on an existing refueling drogue, may be utilized to practice some embodiments of the invention It is further noted that the present invention includes software, firmware and/or computers (including simple logic and/or error circuits) adapted to implement the above stabilization and/or control techniques and/or docking techniques. Also, while some embodiments of the present invention may be practiced manually (such as, for example, use of an operator to fly the drogue 100 to the receiver aircraft) other embodiments may be practiced automatically. Thus, the present invention includes any device or system that may be configured or otherwise used to implement the present invention in an automated manner.

It is noted that in other embodiments of the present invention, the refueling hose 800 might be passively stabilized by placing a rotating mass on the refueling hose instead of or in addition to on the refueling drogue. In such embodiments, a spin stabilization pack for the refueling hose similar to and/or the same as the pack 3000 might be used to retrofit existing refueling hoses to the spin stabilized configuration.

Some embodiments of the present invention may be practiced with any device or system that will enable a conventional refueling drogue and/or refueling hose to be converted to a passively stabilized refueling drogue and/or refueling hose according to the present invention.

As noted above, some embodiments of the present invention may harness the rotational energy from the air turbine 300 to generate power. Such generated power might be used to power lighting, control systems, recharging a component on the receiver aircraft, and/or communications.

Still further, the present invention may be practiced in combination with other techniques used in aerial refueling, such as varying the shape/deployment of a parachute-like canopy attached to the rear of the basket of a refueling drogue. Still, other embodiments of the present invention may be practiced without varying the shape/deployment of a parachute-like canopy.

It is noted that the technique described above to passively stabilize the refueling drogue may be applied on an aircraft wide basis. By installing one or more spin stabilization units that may be rotated by utilizing air directed from outside the aircraft (while in other embodiments a unit may be spun utilizing aircraft power and/or a pre-liftoff spin up, relying on the inertia of the spinning mass to maintain high enough RPMs). The rotating mass might be utilized to passively stabilize the aircraft and/or to offer limited control of the aircraft. Thus, the aircraft might be controlled without the need of drag inducing control surfaces such as, by way of example, slats and control vanes. Such implementations might be applicable to rockets, missiles, helicopters and any form of aircraft. Also, it might be applicable to sea vessels, such as submarines, torpedoes, ships, etc. The present invention may also apply to towed sea objects, for instance sonobuoys.

Typically, in airborne applications, it is the entire body of a rocket, missile, or similar structure that is made to spin to improve that body's stability during flight. Stability is achieved at the expense of (reduced) distance traveled (via increased drag, for example). One application concept would be to attach a spin-capable device or structure to an otherwise non-rotating rocket or missile body to impart stability (as opposed to or in addition to adding vanes which spins the entire rocket). This device may improve the overall distance traveled during flight since the entire body is not rotating, besides stabilizing the body motion. The present invention may also be applicable to towed air vehicles, for instance drones.

In the general area of human physiology, there is an analogy between the inner ear and a 3-axis gyro. When combined with other sensory observations, the operation of the inner ear assists in establishing orientation (balance and stability). When the operation of the inner ear is lost or damaged, an individual often loses the ability to walk via the loss of balance. Some embodiments of the invention include an add-on spinning device that is of a miniaturized configuration and is adapted to human use to augment stability and balance.

In the general area of sports equipment, an add-on spin device may be of use for arrows or other projectiles requiring stability for accuracy considerations. Possibly a ball (e.g., football) may benefit from spin add-on. Also, toys may benefit from an added spin stabilization structure.

The following U.S. patents, the contents of which are incorporated herein by reference in their entirety, may be utilized with the present invention: JUNKINS, et al. "Non-contact Position and Orientation Measurement System and Method", U.S. Pat. No. 6,266,142 B1, Jul. 24, 2001; HARBURG, et al. "Self Regulating Pinwheel Kite Tail", U.S. Pat. No. 5,183,224, Feb. 2, 1993; STEVENS, et al., "Autonomous Systems For The Aerial Refueling Or Decontamination Of Unmanned Airborne Vehicles", U.S. Pat. No. 6,604,711 B1, Aug. 12, 2003; OLLAR, "Aerial Refueling Pod And Constant Tension Line Apparatus", U.S. Pat. No. 6,601,800 B2, Aug. 5, 2003; RUZICKA, "Automated Director Light System for Aerial refueling Operations" U.S. Pat. No. 5,904,729, May 18, 1999; AMBROSE, et al. "Telescoping Refueling Probe", U.S. Pat. No. 6,598,830 B1, Jul. 29, 2003; KIRKLAND, et al. "Passive Variable Speed Drogue", U.S. Pat. No. 6,588,465 B1, Jul. 8, 2003; BANDAK, "Paradrogue Assembly", U.S. Pat. No. 6,464,173 B1, Oct. 15, 2002; GREENHALGH, et al. "Air Refueling Drogue", U.S. Pat. No. 6,375,123 B1, Apr. 23, 2002; MOUSKIS, et al. "Drogue Assembly For In-Flight Refueling", U.S. Pat. No. 6,145,788, Nov. 14, 2000; YOUNG, et al. "Drogue Assembly For In-Flight Refuelling", U.S. Pat. No. 6,119,981, Sep. 19, 2000; WARD, "Hose And Drogue Boom Refueling System, For Aircraft", U.S. Pat. No. 5,573,206, Nov. 12, 1996; KIRKLAND, "Variable Speed Drogue", U.S. Pat. No. 5,427,333, Jun. 27, 1995; KRISPIN, et al. "Controllable Hose-And-Drogue In-Flight Refueling System", U.S. Pat. No. 5,326,052, Jul. 5, 1994; ALDEN, et al. "Aerial Refueling System", U.S. Pat. No. 5,141,178, Aug. 25, 1992; EMERSON, et al. "Aerodynamic Controllably Vented Pressure Modulating Drogue", U.S. Pat. No. 4,927,099, May 22, 1990; PATTERSON, "Aerodynamic Drag Device", U.S. Pat. No. 2,998,949, Sep. 5, 1961; GORDON, et al. "Aerodynamic Drag Service", U.S. Pat. No. 2,946,543, Jul. 26, 1960; PATTERSON, "Improved Aerodynamic Drogue", U.S. Pat. No. 2,823,881, Feb. 18, 1958; FINLAY, "Variable Area Drag Chute", U.S. Pat. No. 2,761,636, Sep. 4, 1956; COBHAM, "Apparatus For Towing And Refueling Aircraft In Flight", U.S. Pat. No. 2,692,103, Oct. 19, 1954; WILLIAMS, et al. "Aircraft Flight Refueling Apparatus", U.S. Pat. No. 2,596,455, May 13, 1952; and STEELE, "Means for Fueling Aircraft in Flight", U.S. Pat. No. 2,582,609, Jan. 15, 1952.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A refueling drogue, comprising:

a first refueling drogue sub-assembly;

a second refueling drogue sub-assembly flexibly connected to the first refueling drogue sub-assembly; and an active stabilization system, wherein the active stabilization system includes a control assembly, that includes control surfaces, that is directly connected to the second refueling drogue sub-assembly, the first refueling drogue sub-assembly includes a refueling boom receptacle, and the second refueling drogue sub-assembly includes a refueling drogue hose connector, the refueling drogue hose connector being adapted to rigidly connect a refueling drogue hose to the second refueling drogue sub-assembly.

2. The refueling drogue according to claim 1, wherein the active stabilization system is adapted to effectively stabilize at least the second refueling drogue sub-assembly when the refueling drogue is placed in an airstream having a relative velocity to the refueling drogue of more than about 80 KEAS.

3. The refueling drogue of claim 1, wherein the refueling drogue is connected to at least one of a refueling drogue hose and a component that is connected to the refueling drogue hose by the refueling drogue hose connector.

4. The refueling drogue of claim 3, wherein the refueling drogue is adapted to rotate relative to the refueling drogue hose.

5. The refueling drogue of claim 1, further comprising a refueling drogue hose.

6. The refueling drogue of claim 1, further comprising a refueling drogue hose in fluid communication with the refueling boom receptacle, wherein the refueling drogue hose interior diameter is about 2.2 inches to about 3.0 inches in diameter.

7. The refueling drogue of claim 1, wherein the refueling drogue extends from an airborne refueling aircraft and is adapted to transfer aviation fuel from the airborne refueling aircraft to a receiver aircraft having a refueling boom when the refueling boom is received in the refueling boom receptacle.

8. The refueling drogue of claim 2, wherein the refueling drogue includes a passive stabilization system, wherein the effective stabilization is obtained with the use of the active stabilization system in combination with a passive stabilization system.

9. The refueling drogue of claim 1, wherein the active stabilization system is adapted to utilize a gyroscope for a stable reference orientation as at least a portion of the refueling drogue moves about the gyroscope.

10. The refueling drogue of claim 1, wherein the active stabilization system includes a plurality of variable position stabilization surfaces located on the refueling drogue.

11. The refueling drogue of claim 1, wherein the active stabilization system includes a plurality of variable position stabilization surfaces located on the refueling drogue such that at least supports of the variable position stabilization surfaces are effectively rigidly linked to the refueling drogue hose connector.

12. The refueling drogue of claim 1, wherein the active stabilization system comprises a stable reference device, and wherein the active stabilization system is adapted to control a plurality of variable position stabilization surfaces based on an orientation of at least one of the first refueling drogue sub-assembly and the second refueling drogue sub-assembly at a first time period and the orientation of the respective first refueling drogue sub-assembly and the second refueling drogue sub-assembly at a second time period after the first time period, the orientation of the respective first refueling drogue sub-assembly and the second refueling drogue sub-assembly being relative to a stable reference as dictated by the stable reference device.

13. The refueling drogue of claim 12, wherein the stable reference device is a rotatable gyroscope.

14. The refueling drogue of claim 12, wherein the stable reference device is a solid-state movement sensor.

15. The refueling drogue of claim 1, wherein the active stabilization system is adapted to control a plurality of variable position stabilization surfaces based on an orientation of the first refueling drogue sub-assembly and the second refueling drogue sub-assembly at a first time period and the orientation of the respective first refueling drogue sub-assembly and the second refueling drogue sub-assembly at a second time period after the first time period to effectively return the respective first refueling drogue sub-assembly and the second refueling drogue sub-assembly to the orientation at the first time period.

16. The refueling drogue of claim 1, wherein the active stabilization system comprises:

a stable reference device adapted to dictate a stable reference; and a logic device adapted to determine a change in an orientation of the refueling drogue relative to the stable reference; wherein the active stabilization system is adapted to control variable position stabilization surfaces to effectively eliminate a change in an orientation of at least one of the first refueling drogue sub-assembly and the second refueling drogue sub-assembly relative to the stable reference based on the determined change.

17. The refueling drogue of claim 16, wherein the logic device comprises at least one of a circuit, a processor and a computer.

18. The refueling drogue of claim 16, wherein the logic device is further adapted to determine a difference in the orientation of the respective first refueling drogue sub-assembly and the second refueling drogue sub-assembly relative to the stable reference, and wherein the active stabilization system is further adapted to control the variable position stabilization surfaces to reduce the difference in the orientation of the respective first refueling drogue sub-assembly and the second refueling drogue sub-assembly relative to the stable reference based on the determined difference.

19. The refueling drogue of claim 18, wherein the active stabilization system is adapted to actively regulate the orientation of the respective first refueling drogue sub-assembly and the second refueling drogue sub-assembly at substantially any rotation angle of the stabilization surfaces from at least one of a horizontal plane and a vertical plane.

20. A refueling drogue assembly, comprising:

the refueling drogue of claim 1, and an autonomous docking system.

* * * * *